US008775944B2

(12) United States Patent
Hayton

(10) Patent No.: US 8,775,944 B2
(45) Date of Patent: Jul. 8, 2014

(54) METHODS AND SYSTEMS FOR INTERACTIVE EVALUATION OF POLICIES

(75) Inventor: Richard Hayton, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 941 days.

(21) Appl. No.: 12/147,029

(22) Filed: Jun. 26, 2008

(65) Prior Publication Data
US 2009/0327909 A1 Dec. 31, 2009

(51) Int. Cl.
G06F 3/00 (2006.01)
G06F 3/048 (2013.01)

(52) U.S. Cl.
USPC ............... 715/744; 715/764; 715/734; 726/3; 709/225

(58) Field of Classification Search
USPC ............ 715/744; 726/1–3, 5–7; 709/223–225
See application file for complete search history.

(56) References Cited

U.S. PATENT DOCUMENTS

| 5,867,494 | A | 2/1999 | Krishnaswamy et al. |
| 5,963,938 | A | 10/1999 | Wilson et al. |
| 5,999,525 | A | 12/1999 | Krishnaswamy et al. |
| 6,058,391 | A | 5/2000 | Gardner |
| 6,289,382 | B1 | 9/2001 | Bowman-Amuah |
| 6,332,163 | B1 | 12/2001 | Bowman-Amuah |
| 6,335,927 | B1 | 1/2002 | Elliott et al. |
| 6,339,832 | B1 | 1/2002 | Bowman-Amuah |
| 6,400,996 | B1 | 6/2002 | Hoffberg et al. |
| 6,434,568 | B1 | 8/2002 | Bowman-Amuah |
| 6,434,628 | B1 | 8/2002 | Bowman-Amuah |
| 6,438,594 | B1 | 8/2002 | Bowman-Amuah |
| 6,442,748 | B1 | 8/2002 | Bowman-Amuah |
| 6,452,915 | B1 | 9/2002 | Jorgensen |
| 6,463,470 | B1 | 10/2002 | Mohaban et al. |
| 6,477,580 | B1 | 11/2002 | Bowman-Amuah |
| 6,477,665 | B1 | 11/2002 | Bowman-Amuah |
| 6,484,258 | B1 | 11/2002 | Haverty |
| 6,496,850 | B1 | 12/2002 | Bowman-Amuah |
| 6,502,102 | B1 | 12/2002 | Haswell et al. |
| 6,502,213 | B1 | 12/2002 | Bowman-Amuah |
| 6,513,721 | B1 * | 2/2003 | Salmre et al. ................. 235/492 |
| 6,523,027 | B1 | 2/2003 | Underwood |
| 6,529,909 | B1 | 3/2003 | Bowman-Amuah |
| 6,529,948 | B1 | 3/2003 | Bowman-Amuah |
| 6,539,396 | B1 | 3/2003 | Bowman-Amuah |
| 6,549,949 | B1 | 4/2003 | Bowman-Amuah |

(Continued)

OTHER PUBLICATIONS

Declaration of non-establishment of International Search Report from PCT/US2008/068490, mailed Feb. 2, 2009, 5 pages.

(Continued)

Primary Examiner — Steven B Theriault
Assistant Examiner — Dino Kujundzic
(74) Attorney, Agent, or Firm — Foley and Lardner LLP; John D. Lanza

(57) ABSTRACT

A system for interactive evaluation of policies includes a first graphical user interface element and a second graphical user interface element. The first graphical user interface element enumerates at least one resource. The second graphical user interface element receives an identification of a characteristic of at least one client and displays a result of an application of at least one policy associated with the at least one resource to the at least one client, the at least on policy applied responsive to the received identification of the characteristic.

59 Claims, 19 Drawing Sheets

(56) References Cited

U.S. PATENT DOCUMENTS

| | | |
|---|---|---|
| 6,550,057 B1 | 4/2003 | Bowman-Amuah |
| 6,571,282 B1 | 5/2003 | Bowman-Amuah |
| 6,578,068 B1 | 6/2003 | Bowman-Amuah |
| 6,584,569 B2 | 6/2003 | Reshef et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,660 B1 | 8/2003 | Bowman-Amuah |
| 6,609,128 B1 | 8/2003 | Underwood |
| 6,615,199 B1 | 9/2003 | Bowman-Amuah |
| 6,615,253 B1 | 9/2003 | Bowman-Amuah |
| 6,633,878 B1 | 10/2003 | Underwood |
| 6,636,242 B2 | 10/2003 | Bowman-Amuah |
| 6,640,145 B2 | 10/2003 | Hoffberg et al. |
| 6,640,238 B1 | 10/2003 | Bowman-Amuah |
| 6,640,244 B1 | 10/2003 | Bowman-Amuah |
| 6,640,248 B1 | 10/2003 | Jorgensen |
| 6,640,249 B1 | 10/2003 | Bowman-Amuah |
| 6,643,652 B2 | 11/2003 | Helgeson et al. |
| 6,668,253 B1 | 12/2003 | Thompson et al. |
| 6,701,514 B1 | 3/2004 | Haswell et al. |
| 6,704,873 B1 | 3/2004 | Underwood |
| 6,715,145 B1 | 3/2004 | Bowman-Amuah |
| 6,718,380 B1 | 4/2004 | Mohaban et al. |
| 6,718,535 B1 | 4/2004 | Underwood |
| 6,721,747 B2 | 4/2004 | Lipkin |
| 6,731,625 B1 | 5/2004 | Eastep et al. |
| 6,742,015 B1 | 5/2004 | Bowman-Amuah |
| 6,754,181 B1 | 6/2004 | Elliott et al. |
| 6,842,906 B1 | 1/2005 | Bowman-Amuah |
| 6,850,252 B1 | 2/2005 | Hoffberg |
| 6,850,893 B2 | 2/2005 | Lipkin et al. |
| 6,877,043 B2 | 4/2005 | Mallory et al. |
| 6,882,634 B2 | 4/2005 | Bagchi et al. |
| 6,888,844 B2 | 5/2005 | Mallory et al. |
| 6,891,881 B2 | 5/2005 | Trachewsky et al. |
| 6,898,204 B2 | 5/2005 | Trachewsky et al. |
| 6,907,546 B1 | 6/2005 | Haswell et al. |
| 6,909,708 B1 | 6/2005 | Krishnaswamy et al. |
| 6,954,800 B2 | 10/2005 | Mallory |
| 6,975,655 B2 | 12/2005 | Fischer et al. |
| 6,988,236 B2 | 1/2006 | Ptasinski et al. |
| 6,993,101 B2 | 1/2006 | Trachewsky et al. |
| 7,000,031 B2 | 2/2006 | Fischer et al. |
| 7,006,881 B1 | 2/2006 | Hoffberg et al. |
| 7,010,546 B1 | 3/2006 | Kolawa et al. |
| 7,027,975 B1 | 4/2006 | Pazandak et al. |
| 7,035,285 B2 | 4/2006 | Holloway et al. |
| 7,072,934 B2 | 7/2006 | Helgeson et al. |
| 7,089,583 B2 | 8/2006 | Mehra et al. |
| 7,100,195 B1 | 8/2006 | Underwood |
| 7,143,089 B2 | 11/2006 | Petras et al. |
| 7,145,898 B1 | 12/2006 | Elliott |
| 7,225,244 B2 | 5/2007 | Reynolds et al. |
| 7,596,803 B1 | 9/2009 | Barto et al. |
| 7,614,015 B2 | 11/2009 | Whalen et al. |
| 7,774,504 B2 | 8/2010 | Chene et al. |
| 8,544,058 B2 * | 9/2013 | Lim .................... 726/1 |
| 8,561,148 B2 * | 10/2013 | Hayton .................... 726/4 |
| 2001/0003455 A1 | 6/2001 | Grobler |
| 2002/0049788 A1 | 4/2002 | Lipkin et al. |
| 2002/0091745 A1 * | 7/2002 | Ramamurthy et al. ....... 709/100 |
| 2002/0120604 A1 | 8/2002 | Labarge et al. |
| 2002/0169887 A1 | 11/2002 | MeLampy et al. |
| 2003/0110192 A1 | 6/2003 | Valente et al. |
| 2003/0226038 A1 | 12/2003 | Raanan et al. |
| 2004/0043770 A1 | 3/2004 | Amit et al. |
| 2004/0073512 A1 | 4/2004 | Maung |
| 2004/0073701 A1 | 4/2004 | Huang et al. |
| 2004/0078750 A1 | 4/2004 | Frank |
| 2004/0167984 A1 | 8/2004 | Herrmann |
| 2005/0021723 A1 | 1/2005 | Saperia |
| 2005/0091209 A1 | 4/2005 | Frank et al. |
| 2005/0144481 A1 * | 6/2005 | Hopen et al. ................... 713/201 |
| 2005/0154699 A1 | 7/2005 | Lipkin et al. |
| 2005/0262076 A1 | 11/2005 | Voskuil |
| 2005/0286466 A1 | 12/2005 | Tagg et al. |
| 2006/0069683 A1 * | 3/2006 | Braddy et al. .................... 707/9 |
| 2006/0069926 A1 | 3/2006 | Ginter et al. |
| 2006/0085543 A1 | 4/2006 | Hrastar et al. |
| 2006/0123467 A1 | 6/2006 | Kumar et al. |
| 2006/0129689 A1 | 6/2006 | Ho et al. |
| 2006/0174320 A1 | 8/2006 | Maru et al. |
| 2007/0043943 A1 | 2/2007 | Peretti |
| 2007/0156695 A1 * | 7/2007 | Lim .................... 707/9 |
| 2008/0046993 A1 * | 2/2008 | Mullick et al. ................... 726/15 |
| 2009/0288135 A1 * | 11/2009 | Chang et al. .................... 726/1 |

OTHER PUBLICATIONS

Written Opinion of the International Searching Authority, from PCT/US2008/068490, mailed Feb. 2, 2009, 8 pages.
Office Action for U.S. Appl. No. 11/769,893 dated Oct. 15, 2009.
Office Action for U.S. Appl. No. 12/147,022 dated Mar. 17, 2011.
Office Action on U.S. Appl. No. 11/769,893 dated Jul. 6, 2011.
Office Action on U.S. Appl. No. 12/147,022 dated Oct. 21, 2011.
Office Action on U.S. Appl. No. 11/769,893 dated Dec. 15, 2011.
Office Action on U.S. Appl. No. 11/769,896 dated Oct. 5, 2012.
Office Action on U.S. Appl. No. 11/769,896 dated May 2, 2012.
Office Action on U.S. Appl. No. 12/147,022 dated Jan. 14, 2013.

* cited by examiner

| Access Routing Policy | | | | | Interface Element 430 | |
|---|---|---|---|---|---|---|
| Provider | Priority | Filter | Access Method | Name on Provider | Match | |
| USFarm | 90 | Users in USA | rdp | notepad | no match | |
| USFarm | 10 | True | rdp | notepad | match | |
| RedWing | 80 | True | ica | notepad | match | |

Mapped Resource: notepad on RedWing    ☐ Override Selection

METHODS AND SYSTEMS FOR INTERACTIVE EVALUATION OF POLICIES

FIELD OF THE INVENTION

The present disclosure relates to methods and systems for policy evaluation. In particular, the present disclosure relates to methods and systems for interactive evaluation of policies.

BACKGROUND OF THE INVENTION

Administrators granting users access to resources may need to manage complex policies defining user rights. One challenge administrators typically face is determining the impact of applying a complex policy to requests from a group of users. Additionally, an administrator may set a policy for a group of users but not know how that policy will impact users in the group who may belong to other groups having additional or conflicting requirements. One solution is to manually log in as each user with the created policy in place and determine the impact of the policies on the user. This is, typically, an unrealistic solution for administrators managing complex policies for large groups of users. Another solution is for the administrator to use a tool allowing the administrator to preview the results of applying a rule to one or more user requests for access, conventionally referred to as a Resultant Set of Policy (RSOP) tool. RSOP tools typically provide the administrator with a list of resources available to one or more users after the application of the rule.

However, RSOP tools are typically limited in functionality and scope. Not all resources that are available to users are necessarily supported by any one tool and an administrator may need several RSOP tools to determine the true impact of a policy on a set of users. Additionally, RSOP tools do not conventionally provide all of the information an administrator needs to understand a resultant set. For example, these tools typically list one or more resources to which access is allowed or denied for one or more users but do not typically explain how the tool made that determination or what the administrator would have to change in order to allow or deny additional resources or make exceptions for particular users. Furthermore, these tools typically do not allow for interactive use by an administrator or for the dynamic generation of a resultant set.

BRIEF SUMMARY OF THE INVENTION

In one aspect, a method for interactive policy evaluation using dynamically generated, interactive resultant sets of policies includes the step of receiving, by a graphical user interface, at least one of: a description of a client requesting access to a resource, a description of the resource, and a description of a method of access requested by the client. The method includes the step of displaying, by the graphical user interface, at least one policy applicable to the at least one received description. The method includes the step of displaying, by the graphical user interface, a decision made by applying the at least one policy to the at least one received description. In some embodiments, the method includes the step of simulating, by a policy simulation engine, an application of the at least one policy to the at least one received description.

In one embodiment, the graphical user interface receives, in the description of the client, a user identifier. In another embodiment, the graphical user interface receives, in the description of the client, a client internet protocol address. In still another embodiment, the graphical user interface receives, in the description of the resource, an identifier of the resource. In still even another embodiment, the graphical user interface receives, in the description of the resource, a file type of the resource. In yet another embodiment, the graphical user interface receives, in the description of the resource, identification of a server on which the resource resides.

In one embodiment, a configuration file is retrieved from a database, the configuration file identifying a property of the resource, such as a server on which the resource resides or an operating system executed by a server on which the resource resides. In another embodiment, the graphical user interface receives, in the description of the requested method of access, a description of a presentation layer protocol. In still another embodiment, the graphical user interface receives, in the description of the requested method of access, a description of a type of client agent. In still even another embodiment, the graphical user interface receives, in the description of the requested method of access, a description of a request to retrieve the resource. In yet another embodiment, the graphical user interface receives, in the description of the requested method of access, a request to remotely access the resource.

In one embodiment, a modification of a displayed filter is received. In another embodiment, a decision identified by the modified filter is displayed, responsive to the modification of the displayed filter. In still another embodiment, a modification of a displayed policy is received. In another embodiment, a decision identified by the modified policy is displayed, responsive to the modification of the displayed policy. In still another embodiment, a determination is made to apply at least one inapplicable policy to a client request for access to a resource. In yet another embodiment, a decision identified by the inapplicable policy is displayed.

In one embodiment, a modification of a displayed description of a user is received. In another embodiment, a decision identified by an application of the at least one policy to the modified description of the user is displayed. In still another embodiment, a modification of a displayed description of a requested resource is received. In yet another embodiment, a decision identified by an application of the at least one policy to the modified description of the resource request is displayed.

In one embodiment, the graphical user interface displays a decision made by applying the at least one policy to the at least one received description. In another embodiment, the graphical user interface displays an auditing decision made by applying the at least one policy to the at least one received description. In still another embodiment, the graphical user interface displays a load balancing decision made by applying the at least one policy to the at least one received description. In yet another embodiment, the graphical user interface displays a caching decision made by applying the at least one policy to the at least one received description.

In another aspect, a system for interactive policy evaluation using dynamically generated, interactive resultant sets of policies includes a graphical user interface, an interactive element in the graphical user interface, and a second element in the graphical user interface. The graphical user interface receives at least one of: a description of a client requesting access to a resource, a description of the resource, and a description of a method of access requested by the client. The interactive element in the graphical user interface displays at least one policy applicable to the received description. The second element in the graphical user interface displays a decision made by applying the at least one policy to the received description. In some embodiments, the system includes a policy simulation engine simulating an application of the at least one policy to the received description.

In one embodiment, the graphical user interface includes a text box element displaying the received description of the client requesting access to the resource. In another embodiment, the graphical user interface includes a text box element displaying the received description of the resource. In still another embodiment, the graphical user interface includes a text box element displaying the received description of the method of access requested by the client. In yet another embodiment, the graphical user interface includes a user interface element that is one of a text box, an element enumerating available resources, an element enumerating Uniform Resource Locaters associated with available resources, a drop-down menu, and graphical depiction of a directory structure.

In still another aspect, a method for interactive evaluation of policies using a graphical user interface includes the step of displaying an identification of at least one resource. The method includes the step of receiving an identification of a characteristic of at least one client requesting access to the at least one resource. The method includes the step of displaying a result of applying the at least one policy associated with the at least one resource to the at least one client requesting access to the least one resource, responsive to the at least one received identification of the characteristic of the at least one client. In some embodiments, the method includes the step of simulating, by a policy simulation engine, an application of the at least one policy to the at least one client requesting access to the at least one resource.

In one embodiment, the method includes the step of receiving an identification of a filter in the at least one policy, the filter satisfied by the at least one client. In another embodiment, the method includes the step of receiving an identification of a filter in the at least one policy, the filter not satisfied by the at least one client. In still another embodiment, the method includes the step of identifying, by a policy simulation engine, a characteristic of the at least one client responsive to an evaluation of at least one filter in the at least one policy.

In one embodiment, the method includes the step of determining whether at least one policy applies to the at least one client, responsive to the received identification of the characteristic. In another embodiment, the method includes the step of displaying an indication that a second identification of a second characteristic is required to determine whether the at least one policy applies to the at least one client. In still another embodiment, the method includes the step of displaying, by the graphical user interface, an indication that the application of the at least one policy results in a denial of access to the at least one resource by the at least one client. In still even another embodiment, the method includes the step of displaying, by the graphical user interface, an indication that the application of the at least one policy results in an authorization of access to the at least one resource by the at least one client. In yet another embodiment, the method includes the step of displaying, by the graphical user interface, an indication that the application of the at least one policy results in a request for additional information associated with the at least one client.

In another aspect, a method for interactive evaluation of policies using a graphical user interface includes the step of displaying an identification of at least one resource and the step of receiving an identification of a characteristic of at least one client requesting access to the at least one resource. The method includes the step of determining whether at least one policy applies to the at least one client, responsive to the received identification of the characteristic. The method includes the step of displaying an indication that a second identification of a second characteristic is required to determine whether the at least one policy applies to the at least one client.

In one embodiment, the method includes the step of receiving an identification of a type of application executed on the at least one client. In another embodiment, the method includes the step of determining that at least one policy applies to the at least one client, responsive to the received identification of the characteristic. In still another embodiment, the method includes the step of determining that at least one policy does not apply to the at least one client, responsive to the received identification of the characteristic. In still even another embodiment, the method includes the step of determining that a second identification of a second characteristic is required to determine whether the at least one policy applies to the at least one client. In yet another embodiment, the method includes the step of displaying, by the graphical user interface, an indication that the application of the at least one policy results in a request for additional information associated with the at least one client.

In still another aspect, a system for interactive evaluation of policies using a graphical user interface includes a first graphical user interface element and a second graphical user interface element. The first graphical user interface element displays at least one resource. The second graphical user interface element receives an identification of a characteristic of at least one client and displays a result of an application of at least one policy associated with the at least one resource to the at least one client. In some embodiments, the system includes a policy simulation engine simulating application of the at least one policy associated with the at least one resource to the at least one client.

In some embodiments, the first graphical user interface element includes a display of a characteristic of the at least one client. In one embodiment, the first graphical user interface element includes a display of an identification of a type of application executed by the at least one client. In another embodiment, the second graphical user interface element includes an interface element indicating that an application of the at least one policy to the at least one client results in a denial of access to the at least one resource by the client. In still another embodiment, the second graphical user interface element includes an interface element indicating that an application of the at least one policy to the at least one client results in an allowance of access to the at least one resource by the client. In yet another embodiment, the second graphical user interface element includes an interface element indicating that additional information associated with the at least one client is needed to identify a result of an application of the at least one policy to the at least one client. In some embodiments, the second graphical user interface element includes an interface element displaying a filter of the at least one policy.

In one embodiment, the second graphical user interface element displays a decision made by applying at least one access control policy associated with the at least one resource to the at least one client. In another embodiment, the second graphical user interface element displays an auditing decision made by applying at least one auditing policy associated with the at least one resource to the at least one client. In still another embodiment, the second graphical user interface element displays a load-balancing decision made by applying at least one load-balancing policy associated with the at least one resource to the at least one client. In yet another embodiment, the second graphical user interface displays a caching decision made by applying at least one caching policy associated with the at least one resource to the at least one client.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 4D is a screen shot depicting one embodiment of a graphical user interface displaying an access routing decision;

FIG. 5B is a screen shot depicting an embodiment of a user interface for interactive evaluation of policies;

FIG. 5C is a screen shot depicting an embodiment of a user interface for interactive evaluation of policies;

DETAILED DESCRIPTION OF THE INVENTION

Figure 1A:
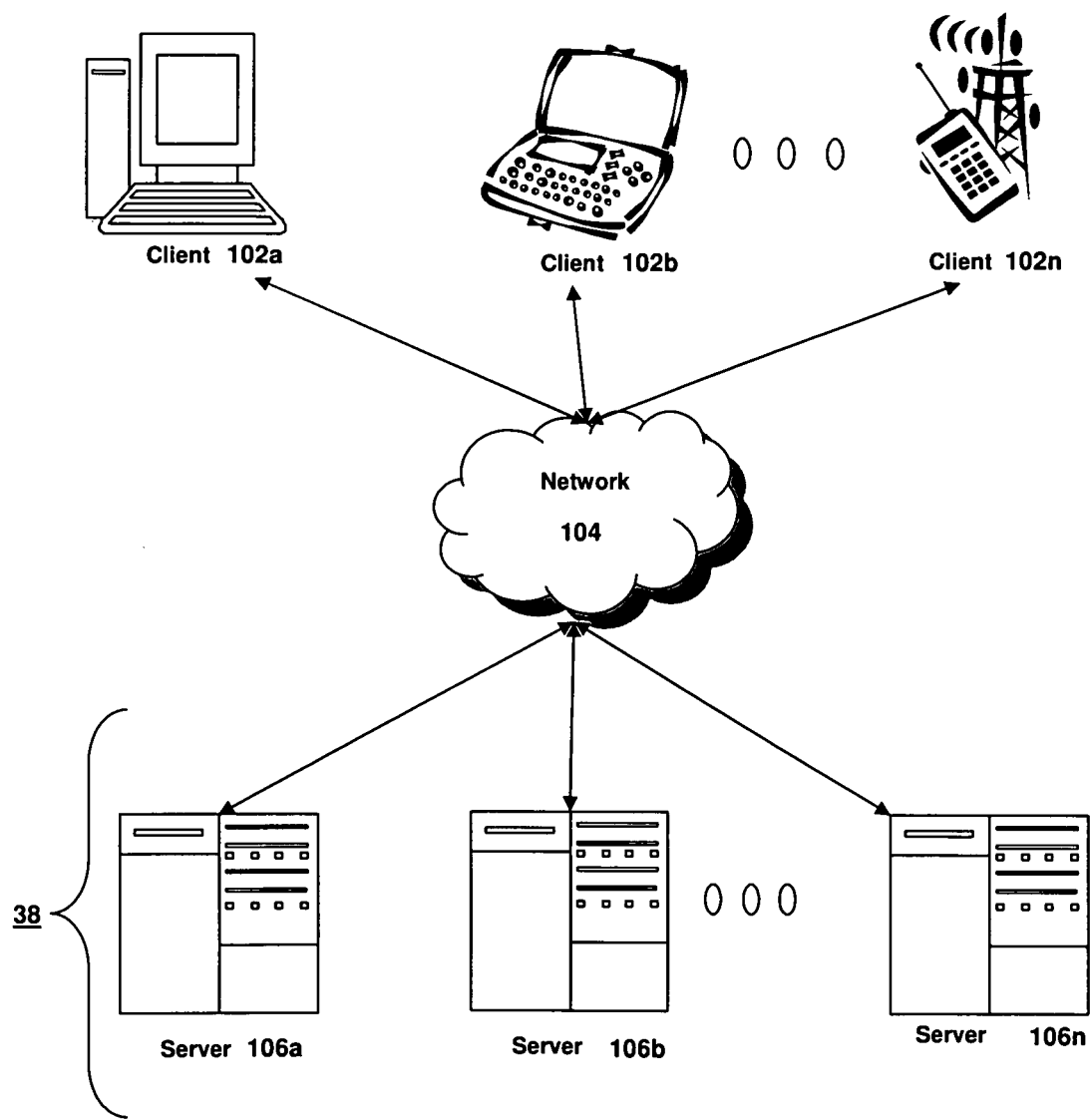
FIG. 1A is a block diagram depicting an embodiment of a network environment including client machines in communication with remote machines.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106 or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38. In another of these embodiments, the servers 106 may be geographically dispersed. In other embodiments, a server farm 38 may be administered as a single entity. In still other embodiments, the server farm 38 comprises a plurality of server farms 38. The servers 106 within each server farm 38 can be heterogeneous—one or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux).

The servers 106 of each server farm 38 do not need to be physically proximate to another server 106 in the same server farm 38. Thus, the group of servers 106 logically grouped as a server farm 38 may be interconnected using a wide-area network (WAN) connection or a metropolitan-area network (MAN) connection. For example, a server farm 38 may include servers 106 physically located in different continents or different regions of a continent, country, state, city, campus, or room. Data transmission speeds between servers 106 in the server farm 38 can be increased if the servers 106 are connected using a local-area network (LAN) connection or some form of direct connection.

Server 106 may be a file server, application server, web server, proxy server, appliance, network appliance, gateway, application gateway, gateway server, virtualization server, deployment server, SSL VPN server, or firewall. In some embodiments, a server 106 provides a remote authentication dial-in user service, and is referred to as a RADIUS server. In other embodiments, a server 106 may have the capacity to function as either an application server or as a master application server. In still other embodiments, a server 106 is a blade server. In yet other embodiments, a server 106 executes a virtual machine providing, to a user or client computer 102, access to a computing environment.

In one embodiment, a server 106 may include an Active Directory. The server 106 may be an application acceleration appliance. For embodiments in which the server 106 is an application acceleration appliance, the server 106 may provide functionality including firewall functionality, application firewall functionality, or load balancing functionality. In some embodiments, the server 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a server 106 executes an application on behalf of a user of a client 102. In other embodiments, a server 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a client 102 communicates with a server 106. In one embodiment, the client 102 communicates directly with one of the servers 106 in a server farm 38. In another embodiment, the client 102 executes a program neighborhood application to communicate with a server 106 in a server farm 38. In still another embodiment, the server 106 provides the functionality of a master node. In some embodiments, the client 102 communicates with the server 106 in the server farm 38 through a network 104. Over the network 104, the client 102 can, for example, request execution of various applications hosted by the servers 106a-106n in the server farm 38 and receive output of the results of the application execution for display. In some embodiments, only the master node provides the functionality required to identify and provide address information associated with a server 106b hosting a requested application.

In one embodiment, the server 106 provides the functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106' hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives output data, such as display data, generated by an execution of the identified application on the server 106.

In some embodiments, the server 106 or a server farm 38 may be running one or more applications, such as an application providing a thin-client computing or remote display presentation application. In one embodiment, the server 106 or server farm 38 executes as an application any portion of the CITRIX ACCESS SUITE by Citrix Systems, Inc., such as the METAFRAME or CITRIX PRESENTATION SERVER and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the server 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to voice over internet protocol (VOIP) communications, such as a soft IP telephone. In further embodiments, the application comprises any application related to real-time data communications, such as applications for streaming video and/or audio.

Figure 1B:
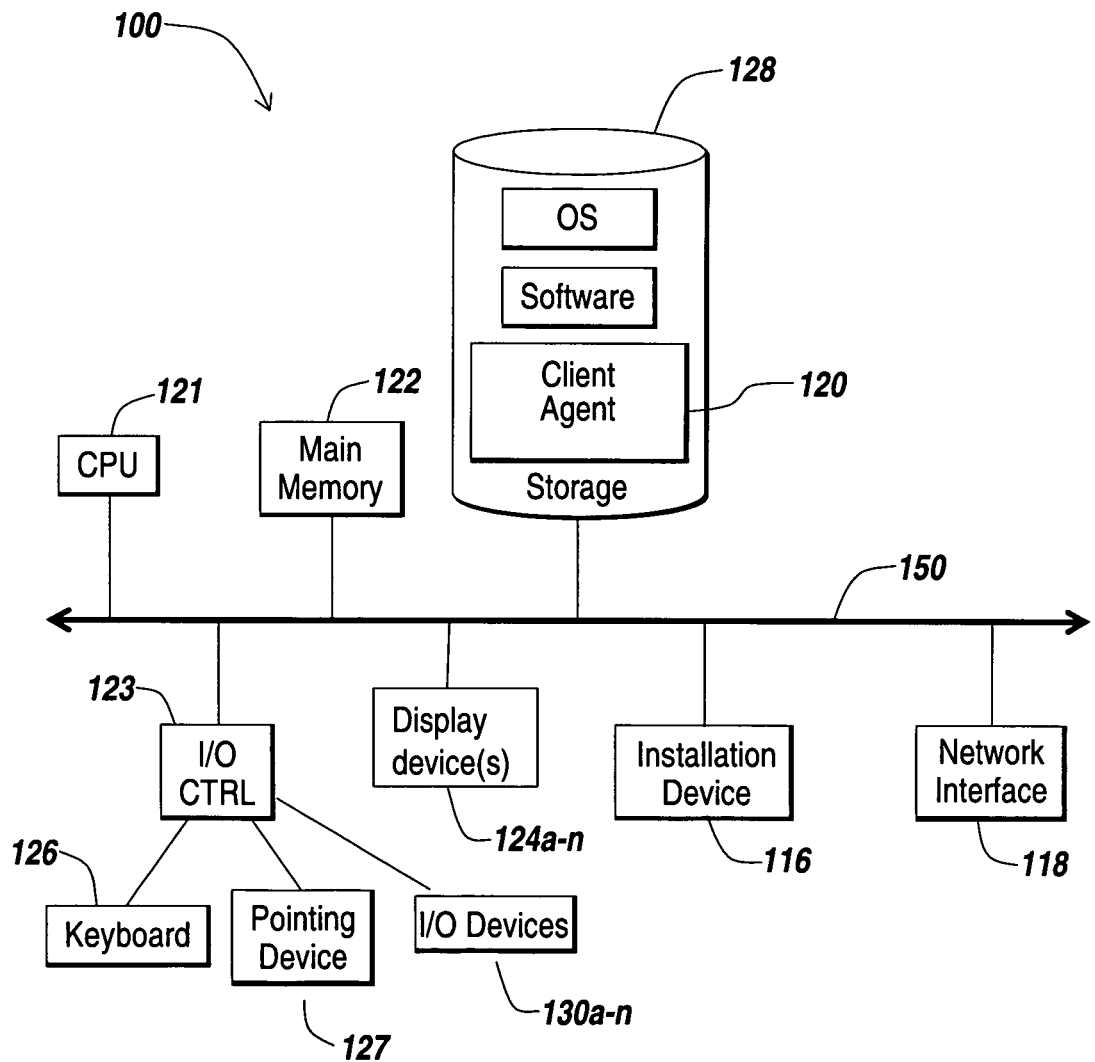
FIGS. 1B and 1C are block diagrams depicting embodiments of computers useful in connection with the methods and systems described herein.
Figure 1C:
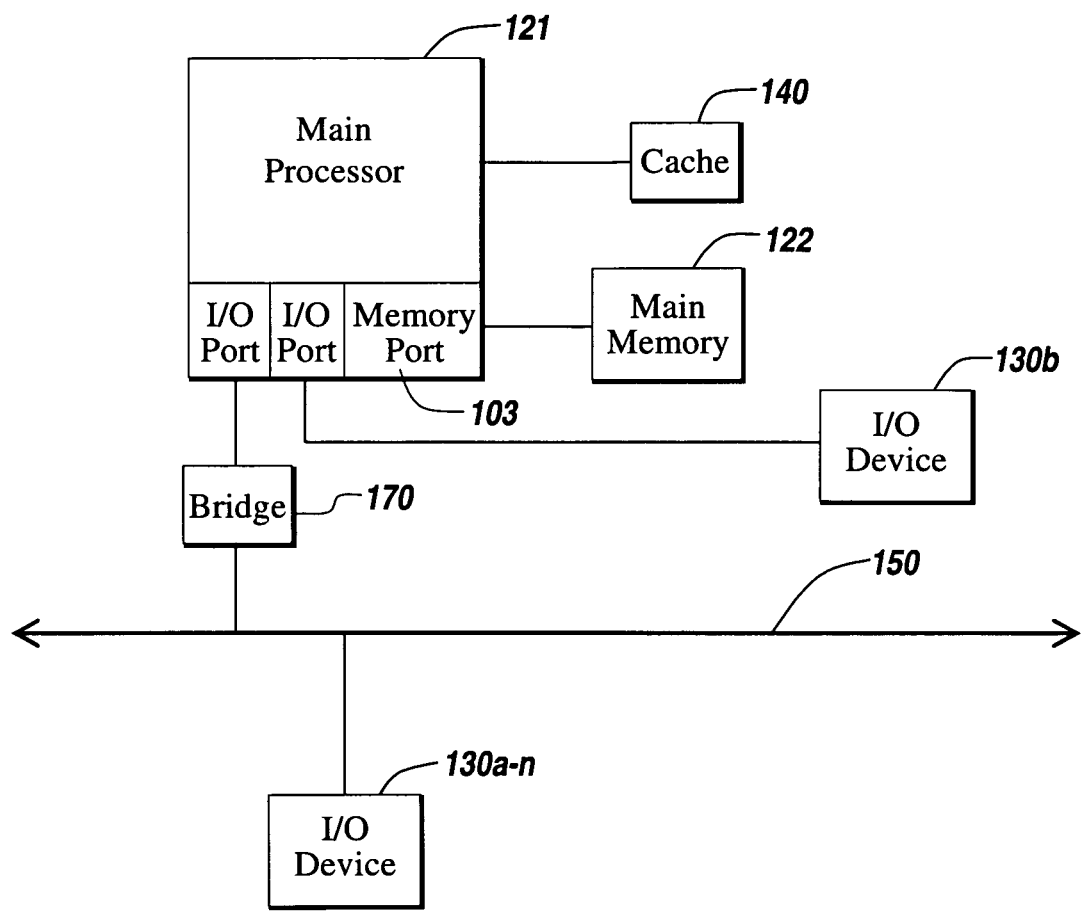

The client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is an iPhone smartphone, manufactured by Apple Computer of Cupertino, Calif.

In one embodiment, the server 106 includes a policy engine for controlling and managing the access to a resource, selection of an execution method for accessing the resource, and the delivery of resources. In another embodiment, the server 106 communicates with a policy engine. In some embodiments, the policy engine determines the one or more resources a user or client 102 may access. In other embodiments, the policy engine determines how the resource should be delivered to the user or client 102, e.g., the method of execution. In still other embodiments, the server 106 provides a plurality of delivery techniques from which to select a method of execution, such as a server-based computing, application streaming, or delivering the application locally to the client 102 for local execution.

In one embodiment, a client 102 requests execution of an application program and a server 106 selects a method of executing the application program. In another embodiment, the server 106 receives credentials from the client 102. In still another embodiment, the server 106 receives a request for an enumeration of available applications from the client 102. In yet another embodiment, in response to the request or receipt of credentials, the server 106 enumerates a plurality of application programs available to the client 102.

In some embodiments, the server 106 selects one of a predetermined number of methods for executing an enumerated application, for example, responsive to a policy of a policy engine. In one of these embodiments, an application delivery system on the server 106 makes the selection. In another of these embodiments, the server 106 may select a method of execution of the application enabling the client 102 to receive output data generated by execution of the application program on a server 106b. In still another of these embodiments, the server 106 may select a method of execution of the application enabling the client 102 to execute the application program locally after retrieving a plurality of application files comprising the application. In yet another of these embodiments, the server 106 may select a method of execution of the application to stream the application via the network 104 to the client 102. In this embodiment, a first plurality of files in a stream of files comprising the application may be stored and executed on the client 102 while the server 106 transmits a second plurality of files in the stream of files to the client. This process may be referred to as "application streaming."

Figure 2A:
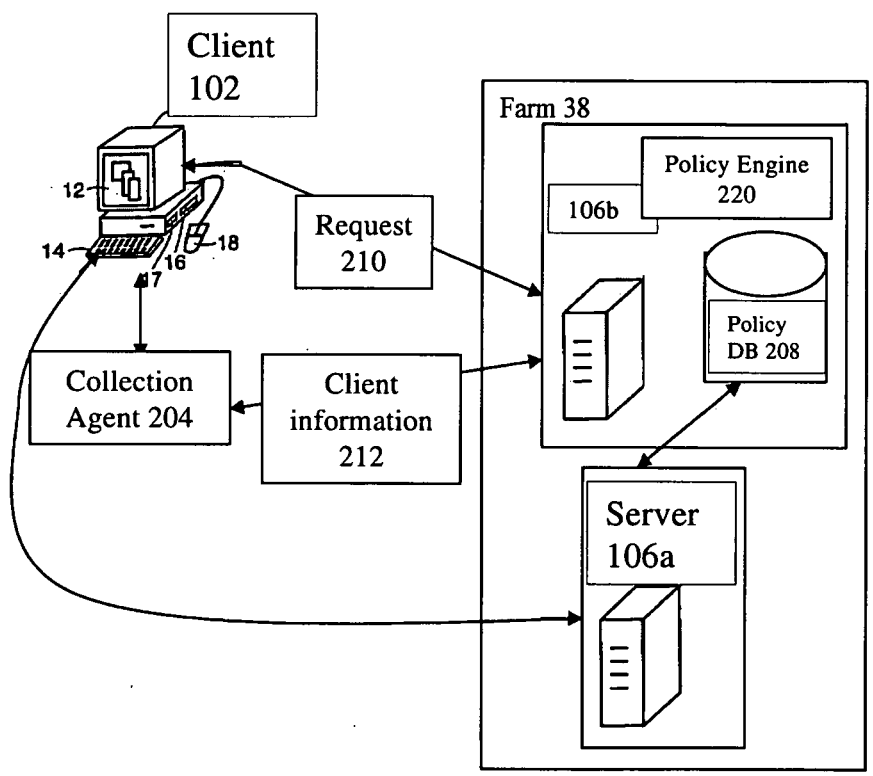
FIG. 2A is a block diagram depicting one embodiment of a network including a policy engine.

Referring now to FIG. 2A, a block diagram depicts one embodiment of a network including a policy engine 220. In one embodiment, the network includes a client 102, a collection agent 204, a policy engine 220, a policy database 208, a farm 38, and a server 106a. In another embodiment, the policy engine 220 is a server 106b. Although only one client 102, collection agent 204, policy engine 220, farm 38, and server 106a are depicted in the embodiment shown in FIG. 2A, it should be understood that the system may provide multiple ones of any or each of those components.

In brief overview, when the client 102 transmits a request 210 to the policy engine 220 for access to a resource, the collection agent 204 communicates with client 102, retrieving information about the client 102, and transmits the client information 212 to the policy engine 220. The policy engine 220 makes an access control decision by applying a policy from the policy database 208 to the received information 212.

In more detail, the client 102 transmits a request 210 for a resource to the policy engine 220. In one embodiment, the policy engine 220 resides on a server 106b. In another embodiment, the policy engine 220 is a server 106b. In still another embodiment, a server 106 receives the request 210 from the client 102 and transmits the request 210 to the policy engine 220. In a further embodiment, the client 102 transmits a request 210 for a resource to a server 106c, which transmits the request 210 to the policy engine 220.

In one embodiment, upon receiving the request, the policy engine 220 initiates information gathering by the collection agent 204. In another embodiment, the collection agent 204 gathers information regarding the client 102 and transmits the information 212 to the policy engine 220.

In some embodiments, the collection agent 204 gathers and transmits the information 212 over a network connection. In some embodiments, the collection agent 204 comprises bytecode, such as an application written in the bytecode programming language JAVA. In some embodiments, the collection agent 204 comprises at least one script. In those embodiments, the collection agent 204 gathers information by running at least one script on the client 102. In some embodiments, the collection agent comprises an Active X control on the client 102. An Active X control is a specialized Component Object Model (COM) object that implements a set of interfaces that enable it to look and act like a control.

In one embodiment, the policy engine 220 transmits the collection agent 204 to the client 102. In another embodiment, a server 106 may store or cache the collection agent 204. The server 106 may then transmit the collection agent 204 to a client 102. In one embodiment, the policy engine 220 requires a second execution of the collection agent 204 after the collection agent 204 has transmitted information 212 to the policy engine 220. In this embodiment, the policy engine 220 may have insufficient information 212 to determine whether the client 102 satisfies a particular condition. In other embodiments, the policy engine 220 requires a plurality of executions of the collection agent 204 in response to received information 212.

In some embodiments, the policy engine 220 transmits instructions to the collection agent 204 determining the type of information the collection agent 204 gathers. In those embodiments, a system administrator may configure the instructions transmitted to the collection agent 204 from the policy engine 220. This provides greater control over the type of information collected. This also expands the types of access control decisions that the policy engine 220 can make, due to the greater control over the type of information collected. The collection agent 204 gathers information 212 including, without limitation, machine ID of the client 102, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information such as internet protocol address or range of addresses, machine ID of the server 106, date or time of access request including adjustments for varying time zones, and authorization credentials. In some embodiments, a collection agent gathers information to determine whether access to a resource can be accelerated on the client using an acceleration program.

In some embodiments, the device type is a personal digital assistant. In other embodiments, the device type is a cellular telephone. In other embodiments, the device type is a laptop computer. In other embodiments, the device type is a desktop computer. In other embodiments, the device type is an Internet kiosk.

In some embodiments, the digital watermark includes data embedding. In some embodiments, the watermark comprises a pattern of data inserted into a file to provide source information about the file. In other embodiments, the watermark comprises data hashing files to provide tamper detection. In other embodiments, the watermark provides copyright information about the file.

In some embodiments, the network connection information pertains to bandwidth capabilities. In other embodiments, the network connection information pertains to Internet Protocol address. In still other embodiments, the network connection information consists of an Internet Protocol address. In one embodiment, the network connection information comprises a network zone identifying the logon agent to which the client 102 provided authentication credentials.

In some embodiments, the authorization credentials include a number of types of authentication information, including without limitation, user names, client names, client addresses, passwords, PINs, voice samples, one-time passcodes, biometric data, digital certificates, tickets, etc. and combinations thereof. In one of these embodiments, after receiving the gathered information 212, the policy engine 220 makes an access control decision based on the received information 212.

Figure 2B:
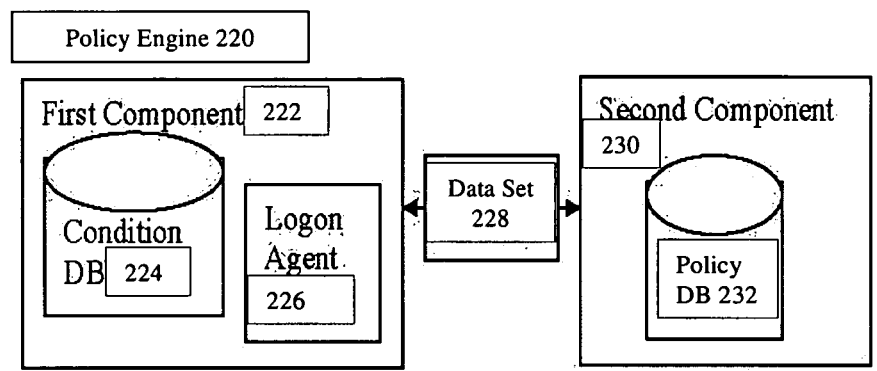
FIG. 2B is a block diagram depicting one embodiment of a policy engine, including a first component comprising a condition database and a logon agent, and including a second component comprising a policy database.

Referring now to FIG. 2B, a block diagram depicts one embodiment of a policy engine 220, including a first component 222 comprising a condition database 224 and a logon agent 226, and including a second component 230 comprising a policy database 232. The first component 222 applies a condition from the condition database 224 to information received about client 102 and determines whether the received information satisfies the condition. In some embodiments, the condition database 224 stores filters, which are applied to information associated with a user or the user's client device.

In some embodiments, a condition or filter may require that the client 102 execute a particular operating system to satisfy the condition. In some embodiments, a condition or filter may require that the client 102 execute a particular operating system patch to satisfy the condition. In still other embodiments, a condition or filter may require that the client 102 provide a MAC address for each installed network card to satisfy the condition or filter. In some embodiments, a condition or filter may require that the client 102 indicate membership in a particular Active Directory to satisfy the condition. In another embodiment, a condition or filter may require that the client 102 execute a virus scanner to satisfy the condition. In other embodiments, a condition or filter may require that the client 102 execute a personal firewall to satisfy the condition. In some embodiments, a condition or filter may require that the client 102 comprise a particular device type to satisfy the condition or filter. In other embodiments, a condition or filter may require that the client 102 establish a particular type of network connection to satisfy the condition or filter.

In some embodiments, a logon agent 226 resides outside of the policy engine 220. In other embodiments, the logon agent 226 resides on the policy engine 220. In one embodiment, the first component 222 includes a logon agent 226, which initiates the information gathering about client 102. In some embodiments, the logon agent 226 further comprises a data store. In these embodiments, the data store includes the conditions for which the collection agent may gather information. In one of these embodiments, the data store is distinct from the condition database 224.

In some embodiments, the logon agent 226 initiates information gathering by executing the collection agent 204. In other embodiments, the logon agent 226 initiates information gathering by transmitting the collection agent 204 to the client 102 for execution on the client 102. In still other embodiments, the logon agent 226 initiates additional information gathering after receiving information 212. In one embodiment, the logon agent 226 also receives the information 212. In this embodiment, the logon agent 226 generates the data set 228 based upon the received information 212. In some embodiments, the logon agent 226 generates the data set 228 by applying a condition from the database 224 to the information received from the collection agent 204.

In another embodiment, the first component 222 includes a plurality of logon agents 226. In this embodiment, at least one of the plurality of logon agents 226 resides on each network domain from which a client 102 may transmit a resource request. In this embodiment, the client 102 transmits the resource request to a particular logon agent 226. In some embodiments, the logon agent 226 transmits to the policy engine 220 the network domain from which the client 102 accessed the logon agent 226. In one embodiment, the network domain from which the client 102 accesses a logon agent 226 is referred to as the network zone of the client 102.

In some embodiments, the condition database 224 stores the conditions or filters that the first component 222 applies to received information. The policy database 232 stores the policies that the second component 230 applies to the received data set 228. In some embodiments, the condition database 224 and the policy database 232 store data in an ODBC-compliant database. For example, the condition database 224 and the policy database 232 may be provided as an ORACLE database, manufactured by Oracle Corporation of Redwood Shores, Calif. In other embodiments, the condition database 224 and the policy database 232 can be a MICROSOFT ACCESS database or a MICROSOFT SQL server database, manufactured by Microsoft Corporation of Redmond, Wash.

In some embodiments, if the received information satisfies a condition, the first component 222 stores an identifier for that condition in a data set 228 and the second component applies a policy from the policy database to the data set. In other embodiments, after the first component 222 applies the received information to each condition in the condition database 224, the first component transmits the data set 228 to second component 230. In one embodiment, the first component 222 transmits only the data set 228 to the second component 230. Therefore, in this embodiment, the second component 230 does not receive information 212, only identifiers for satisfied conditions. The second component 230 receives the data set 228 and makes an access control decision by applying a policy from the policy database 232 based upon the conditions identified within data set 228.

In some embodiments, the policy engine determines whether the user and the client device satisfy the requirements expressed in a filter. In one of these embodiments, the policy engine accesses an enumeration of filters to make the determination. The enumeration of filters may be stored in a condition database. In another of these embodiments, the use of the filter replaces the need for the data set and the policy database. In still another of these embodiments, the policy engine includes a condition database co-located with a policy database. In yet another of these embodiments, where the condition database and the policy database are collocated, the policy engine does not generate a data set to determine whether the user and the client device satisfy the requirements expressed in the filter.

In one embodiment, policy database 232 stores the policies applied to the received information 212. In one embodiment, the policies stored in the policy database 232 are specified at least in part by the system administrator. In another embodiment, a user specifies at least some of the policies stored in the policy database 232. The user-specified policy or policies are stored as preferences. The policy database 232 can be stored in volatile or non-volatile memory or, for example, distributed through multiple servers.

In one embodiment, a policy allows access to a resource only if one or more conditions are satisfied. In another embodiment, a policy allows access to a resource but prohibits transmission of the resource to the client 102. Another policy might make connection contingent on the client 102 that requests access being within a secure network. In some embodiments, the resource is an application program and the client 102 has requested execution of the application program. In one of these embodiments, a policy may allow execution of the application program on the client 102. In another of these embodiments, a policy may enable the client 102 to receive a stream of files comprising the application program. In still another of these embodiments, a policy may allow only execution of the application program on a server 106, such as an application server, and require the server 106 to transmit output data to the client 102.

In some embodiments, a determination is made as to a type of connection to establish when granting access to a resource responsive to a determination by a policy engine such as the policy engine 220 described in connection with FIG. 2A and FIG. 2B. In other embodiments, a determination is made as to a method for granting access to a resource, such as a method for execution, responsive to a determination by a policy engine such as the policy engine 220 described in connection with FIG. 2A and FIG. 2B. In still other embodiments, the server 106 receiving the credentials and the request to execute the resource further comprises such a policy engine 220. In yet other embodiments, the server 106 applies an access control policy to determine whether or not to grant access to the resource.

Figure 3A:
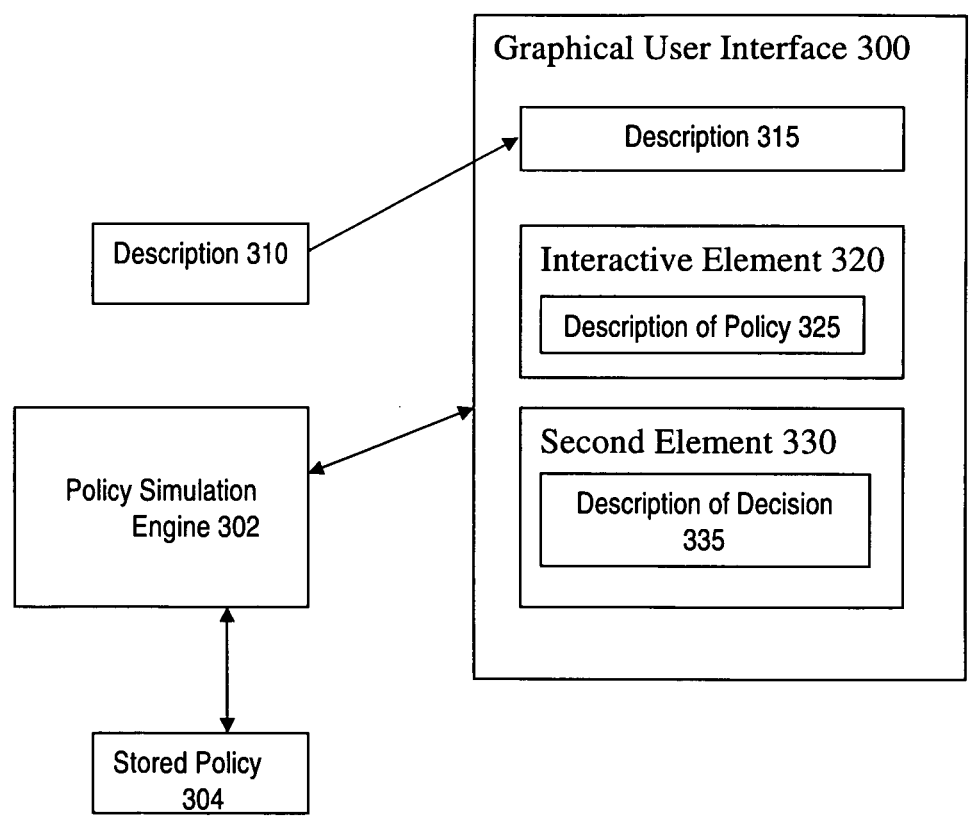
FIG. 3A is a block diagram depicting one embodiment of a system for interactive policy evaluation using resultant sets of policies.

Referring now to FIG. 3A, a block diagram depicts one embodiment of a system for interactive policy evaluation using resultant sets of policies. In brief overview, a graphical user interface 300 receives a description 310 and displays a description 315, an interactive element 320 and a second interface element 330. The interactive element 320 displays a description of a policy 325 and the second element 330 displays a description of a decision 335. In some embodiments, the system includes a policy simulation engine 302 and at least one stored policy 304.

In one embodiment, the graphical user interface 300 provides an interactive tool allowing a user—such as an administrator defining and managing policies—to specify the details of a request for access to a resource and to view the applicable policies and the resulting permissions and settings. In another embodiment, the graphical user interface 300 receives, from a user of the graphical user interface, the description 310, which includes at least one of a description of a user, a description of a resource, and of a description of a method of accessing a resource. In still another embodiment, the graphical user interface 300 displays a user interface element displaying policies applicable to any set of circumstances the user specifies, including theoretical circumstances. In yet another embodiment, the interactive tool simulates policy application to display, in the graphical user interface 300, an outcome of applying a policy to a set of characteristics associated with a user, a resource, or the user's request to access the resource. In some embodiments, the tool displays policies applied to previous requests. In one of these embodiments, the tool may use a session identifier to retrieve details associated with a previous request for access. In other embodiments, the interactive tool is a policy simulation engine 302.

Referring still to FIG. 3A, and in greater detail, a graphical user interface 300 receives a description 310. The graphical user interface 300 receives, at least one of: a description of a client requesting access to a resource, a description of the resource, and a description of a method of access requested by the client. In one embodiment, the graphical user interface 300 includes a text box element displaying the received description of the client requesting access to the resource. In another embodiment, the graphical user interface 300 includes a text box element displaying the received description of the resource. In still another embodiment, the graphical user interface 300 includes a text box element displaying the received description of the method of access requested by the client.

In some embodiments, the graphical user interface 300 includes a user interface element for entering the description of the client. In one of these embodiments, the user interface element is a text box. In another of these embodiments, the user interface element is a drop-down menu. In still another of these embodiments, the user interface element is a graphical depiction of a directory structure. In other embodiments, the description of the client includes, but is not limited to, at least one of user identity, client IP address, virus checker status, and time of day.

In some embodiments, the graphical user interface 300 includes a user interface element for entering the description of the resource. In one of these embodiments, the user interface element is a text box. In another of these embodiments, the user interface element is a drop-down menu. In still another of these embodiments, the user interface element is a graphical depiction of a directory structure. In still even another of these embodiments, the user interface element is an element enumerating available resources. In yet another of these embodiments, the user interface element is an element enumerating Uniform Resource Locaters associated with available resources. In other embodiments, the description of the resource includes, but is not limited to, at least one of an identifier for the resource (e.g., a URI), a property of the resource (such as the file type or version), and an operating system executing on a machine providing access to the resource.

In some embodiments, the graphical user interface 300 includes a user interface element for entering the description of the method of access. In one of these embodiments, the user interface element is a text box. In another of these embodiments, the user interface element is a drop-down menu. In still another of these embodiments, the user interface element is an element enumerating available methods of access. In one embodiment, the interactive element 320 displays at least one policy applicable to the client request responsive to the received description. In other embodiments, the description of the method of access includes, but is not limited to, at least one of a type of access (download, view remotely, application streaming), a protocol (e.g., ICA, RDP, X11, VNC, etc.), and a software application executing on the client (e.g., an ICA client, an RDP client, an X11 client, a VNC client, etc.).

In some embodiments, the graphical user interface 300 displays the description 315, generated responsive to the received description 310. In one of these embodiments, the description 315 is the description 310. In another of these embodiments, the description 315 includes information in addition to the description 310. For example, in still another of these embodiments, the description 310 describes a user and the description 315 describes the user and a default method of accessing resources.

In some embodiments, the system includes a policy simulation engine 302. In one of these embodiments, the policy simulation engine 302 is a policy engine as described above in connection with FIGS. 2A-2B. In another of these embodiments, the policy simulation engine 302 replaces the policy engine 220. In still another of these embodiments, the system includes both a policy engine—which may be the policy engine 220 or a different policy engine—and the policy simulation engine 302.

In some embodiments, filters are used in conjunction with the policy simulation engine 302. In other embodiments, filters are used within policies, including, but not limited to, access control policies, auditing policies, network routing policies, load balancing policies, policies relating to error reporting, and failure handling policies. In still other embodiments, policy engines other than those described above in connection with FIGS. 2A-2B use filters to evaluate an action to take with respect to a particular user or resource. In one of these embodiments, the policy engine is not an active policy engine; for example, a policy engine may operate in a system for interactive policy evaluation without providing decisions for active sessions, while a second policy engine makes decisions.

In some embodiments, a filter is used to describe at least one characteristic for evaluation when applying a policy. In one of these embodiments, the at least one characteristic is associated with a resource. In another of these embodiments, the at least one characteristic is associated with a user. In still another of these embodiments, the at least one characteristic is associated with a combination of users or resources. In yet another of these embodiments, the at least one characteristic is evaluated to make a policy decision, such as an access control decision. In other embodiments, filters are used to determine whether at least one entity matches at least one specified condition.

In some embodiments, the policy simulation engine 302 accesses at least one stored policy 304. In other embodiments, a policy includes, or is defined by, one or more filters. In still other embodiments, a policy includes, or is defined by, one or more access control lists. In still even other embodiments, a stored policy 304 is a stored list of filters. In yet other embodiments, the stored policy 304 includes a plurality of files. In one of these embodiments, a file in a file server environment has an access control list associated with the file but neither the file nor the access control list is separately stored.

In one embodiment, an access control list maps at least one filter to an allowed or denied permission setting included in the access control list. In another embodiment, a filter is a simple or compound condition that may or may not be met by a client requesting access to a resource. In still another embodiment, simple conditions include group membership, role membership, IP range membership, and a characteristic of a client device requesting access to a resource, such as whether the client device executes a particular application or has access to a particular hardware resource. In yet another embodiment, compound conditions are combinations of simple conditions that may be defined using a filter editor.

In one embodiment, a filter describes at least one characteristic of a resource. In another embodiment, a filter may specify a group of resources to which a particular resource should belong to satisfy the filter, such as, for example, specifying a particular named group of resources (such as, "office applications"), and specifying an operating system from which the resource is accessed (the WINDOWS VISTA operating system), and specifying a display capability supported by a system from which the resource is accessed. In still another embodiment, and for example, a filter may include a "leaf" condition specifying at least one of the following: a group of resources to which the resource should belong, a sub-directory which should enumerate the resource, an operating system capable of supporting the resource, a computing capability provided by a system from which the resource is accessed (such as a display capability or computing functionality), a required network characteristic (such as a per-application IP address), an environment in which the resource should execute (for example, an isolation environment), or a licensing requirement (for example, requiring a license for a specific user or for a specific type of request).

In one embodiment, a filter describes a characteristic associated with a combination of a user and a resource. In another embodiment, the filter may specify a first condition associated with a user and a second condition associated with a resource, and to satisfy the filter, the user and the resource must each satisfy the specified conditions. In still another embodiment, the filter specifies that a user be authorized to access a resource—for example, that the user own the resource, be licensed to use the resource, or have permission from an external policy system to access the resource. In yet another embodiment, for example, a filter specifies that a user satisfy a first filter and that the resource satisfy a second filter.

In one embodiment, a filter applies to a plurality of users. In another embodiment, a filter may specify a condition that a group of users involved in a collaborative application must all satisfy in order to satisfy the filter, for example, that all users belong to a particular group, or that at least one of the plurality of users has a particular role. In still another embodiment, a filter applies to a plurality of resources. In still even another embodiment, a filter applies to a plurality of users and to a resource. In still even another embodiment, a filter applies to a plurality of users and to a plurality of resources. In yet another embodiment, a filter applies to a plurality of resources and to a user.

In some embodiments, a filter is used in combination with a weight. In one of these embodiments, a weight is assigned to a condition and if the weight passes a threshold, the filter is satisfied. In other embodiments, weights are used in policies instead of filters. In still other embodiments, a policy specifies a requirement for a priority assigned to a particular resource or method of accessing the resource. In yet other embodiments, a policy is used in combination with a neural network.

In some embodiments, a filter defines a dynamic group. In one of these embodiments, the filter identifies a user belonging to the dynamic group. In another of these embodiments, the filter identifies a user excluded from the dynamic group. In still another of these embodiments, a member of the dynamic group satisfies a requirement specified by the filter. In some embodiments, the graphical user interface 300 provides an administrator with an improved method for generating filters and filter-based policies and simulating the result of applying the policy to a particular client or resource.

In one embodiment, the graphical user interface 300 allows an administrator to enter all details relating to a client, a resource, and an access method. In another embodiment, the graphical user interface 300 displays the access permissions and settings that result from simulating an application of a policy to the client, resource, or access method. In still another embodiment, only some details are entered, and the graphical user interface 300 lists the possible values for the other settings with the resulting access for each. For example, the graphical user interface 300 may allow the administrator to specify what type of access is required (access via presentation layer protocol connection to a server, access via downloading, access via application streaming, etc.) before displaying a description of whether access is allowed or denied and whether any alternatives are available.

In one embodiment, a server 106 displays the graphical user interface 300. In another embodiment, a client 102 displays the graphical user interface 300. The graphical user interface 300 displays a plurality of interface elements providing a number of different views of actual or theoretical access requests and decisions. Some or all of these interface elements may be optional, and some may not apply to certain access attempts. Each view may be presented as a window, tab, panel or other abstraction. Each view displays some details of the access attempt and may also allow modification of these details. In one embodiment, all views operate on the same underlying data, so that a change made by the administrator in one view leads to immediate changes to all other views. Although only certain views are described in connection with FIGS. 3A-3D, it should be understood that the system may provide multiple ones of any or each of those components and that other views representing different ways of viewing or manipulating the data displayed in the graphical user interface may be presented.

Figure 3B:
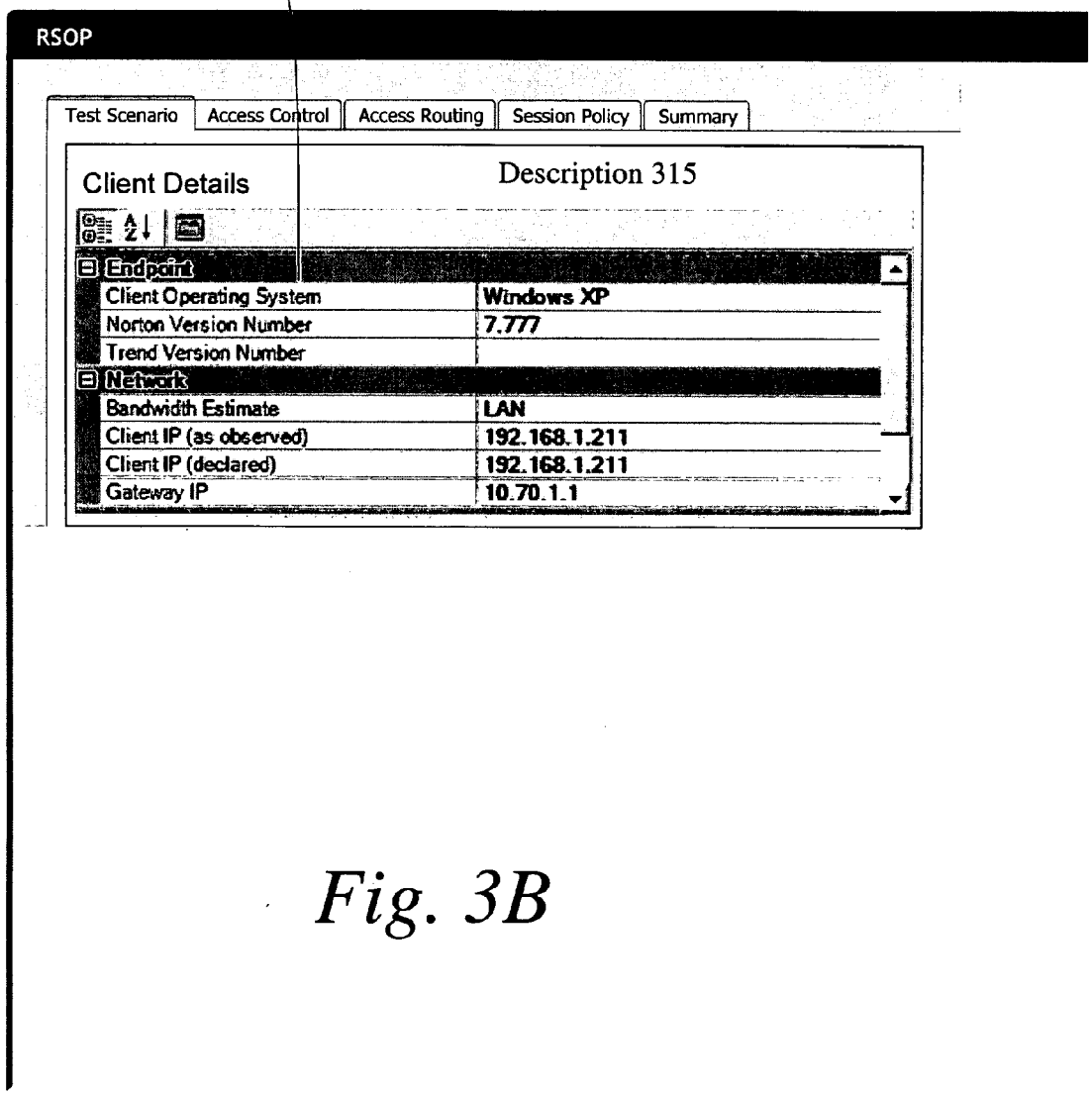
FIG. 3B is a screen shot depicting one embodiment of a graphical user interface element receiving and displaying a description of a client requesting access to a resource.

Referring now to FIG. 3B, a screen shot depicts one embodiment of a graphical user interface element for receiving and displaying a description of a client requesting access to a resource. FIG. 3B depicts the graphical user interface 300 and a description 315 generated from the received description 310. In the embodiment depicted by FIG. 3B, the graphical user interface 300 received a description of a client requesting access to the resource, the description including an identification of an operating system executing on a client, an identification of an anti-virus program executing on the client, a type of network to which the client connects, and an internet protocol address associated with the client.

In one embodiment, the description of the client includes information associated with a client—such as machine type, operating system version, software executing on the client, network configuration details, and information about a user of the client—and allows the administrator to enter or change the information. In another embodiment, the graphical user interface displays an interface element for loading the information saving the information to a file. In still another embodiment, the graphical user interface 300 displays a description generated from a list of applicable client data retrieved from a directory.

In some embodiments, the graphical user interface 300 includes an interface element for receiving and displaying a description of a client requesting access to a resource. In one of these embodiments, the interface element includes a text box, a drop-down menu, hyperlink, or a graphical depiction of a directory structure. For example, and as shown in FIG. 3B, the graphical user interface may include an interface element 305 into which a user, such as an administrator, can enter the description 310.

Figure 3C:
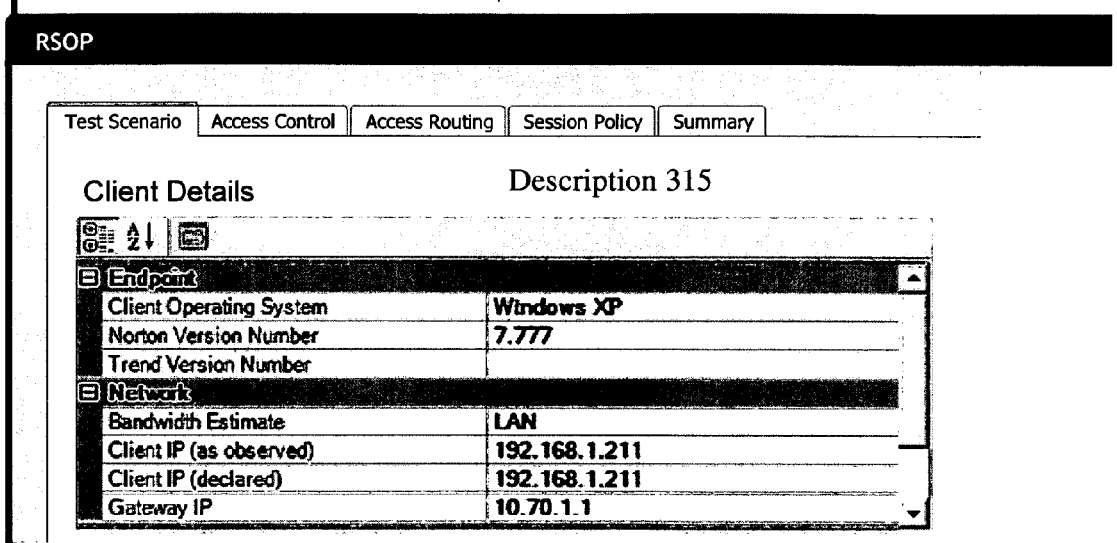
FIG. 3C is a screen shot depicting one embodiment of a graphical user interface element for displaying a description of a resource requested by the client.

Referring now to FIG. 3C, a screen shot depicts one embodiment of a graphical user interface element for displaying a description of a resource requested by the client. In one of these embodiments, the interface element may be a text box, an element enumerating available resources, an element enumerating Uniform Resource Locaters associated with available resources, a drop-down menu, or a graphical depiction of a directory structure. In still other embodiments, the graphical user interface 300 includes an interface element for displaying a description of a method for accessing a requested resource. In one of these embodiments, the interface element may be a text box, an element enumerating available methods of access, or a drop-down menu.

In one embodiment, the graphical user interface 300 includes an interface element allowing a user to enter or modify a description of a resource. In another embodiment, the graphical user interface 300 may display an enumeration of resources retrieved from a resource directory. In still another embodiment, the description of the resource is an identifier of the resource, such as a uniform resource identifier. In still even another embodiment, the graphical user interface 300 includes an interface element allowing a user to enter or modify a description of a policy. In yet another embodiment, the graphical user interface 300 includes an interface element allowing a user to enter or modify a description of a filter.

Figure 3D:
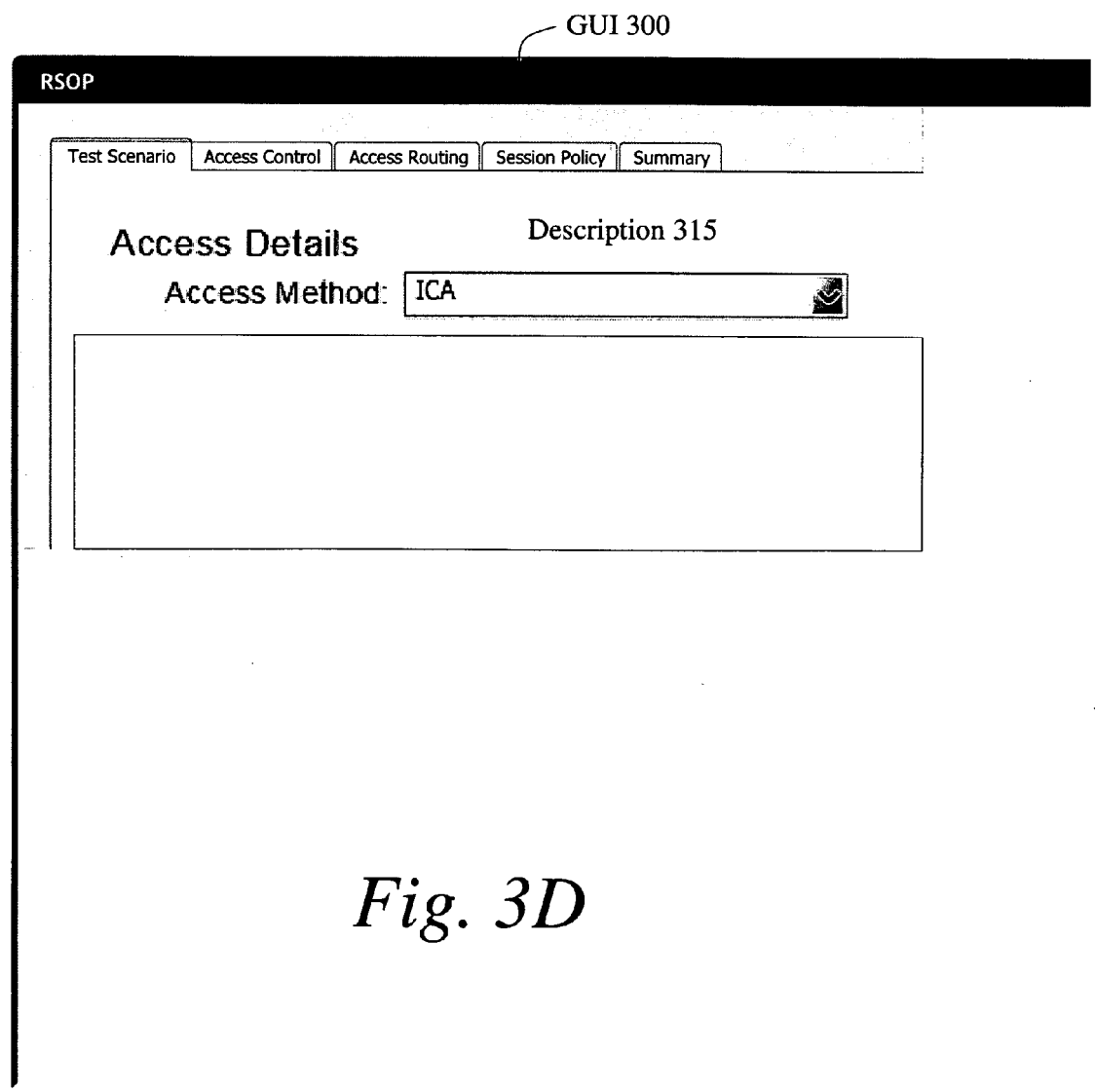
FIG. 3D is a screen shot depicting one embodiment of a graphical user interface element for displaying a description of a method of access requested by the client.

Referring now to FIG. 3D, a screen shot depicts one embodiment of a graphical user interface element for displaying a description of a method of access requested by the client. The method of access indicates the type of access attempted by the client. In one embodiment, the description is of a method for retrieving a resource such as an application program. In another embodiment, the description is of a method for accessing a remotely-executing resource, for example, via a presentation layer protocol connection between the client and a machine remote to the client. In still another embodiment, the description is of a method for streaming the resource to the client from a machine remote to the client.

Referring back to FIG. 3A, the interactive element 320 displays a description of a policy 325 and the second element 330 displays a description of a decision 335. The interactive element 320 displays at least one policy applicable to the client request for access to the resource. In one embodiment, the interactive element 320 displays at least one policy applicable to the client request, the at least one policy identified responsive to the received description. In another embodiment, the interactive element 320 displays all the policies that have an effect on whether access is allowed or denied for the specified client/resource and access method described. In another embodiment, the interactive element 320 includes a user interface element for requesting an override of an aspect of the policy. In still another embodiment, the interactive element 320 includes a user interface element for viewing and modifying a filter, condition or sub-policy associated with the policy.

The second element 330 in the graphical user interface 300 displays a decision made by applying the at least one policy to the received description. In some embodiments, the second element 330 includes a user interface element displaying a decision made by applying a policy already in use by an administrator in determining access rights. In other embodiments, the second element 330 includes a user interface element displaying a second decision made by a applying a second policy to a second received description. In still other embodiments, the interactive element 320 includes a user interface element for requesting an override of an aspect of the policy.

Figure 3E:
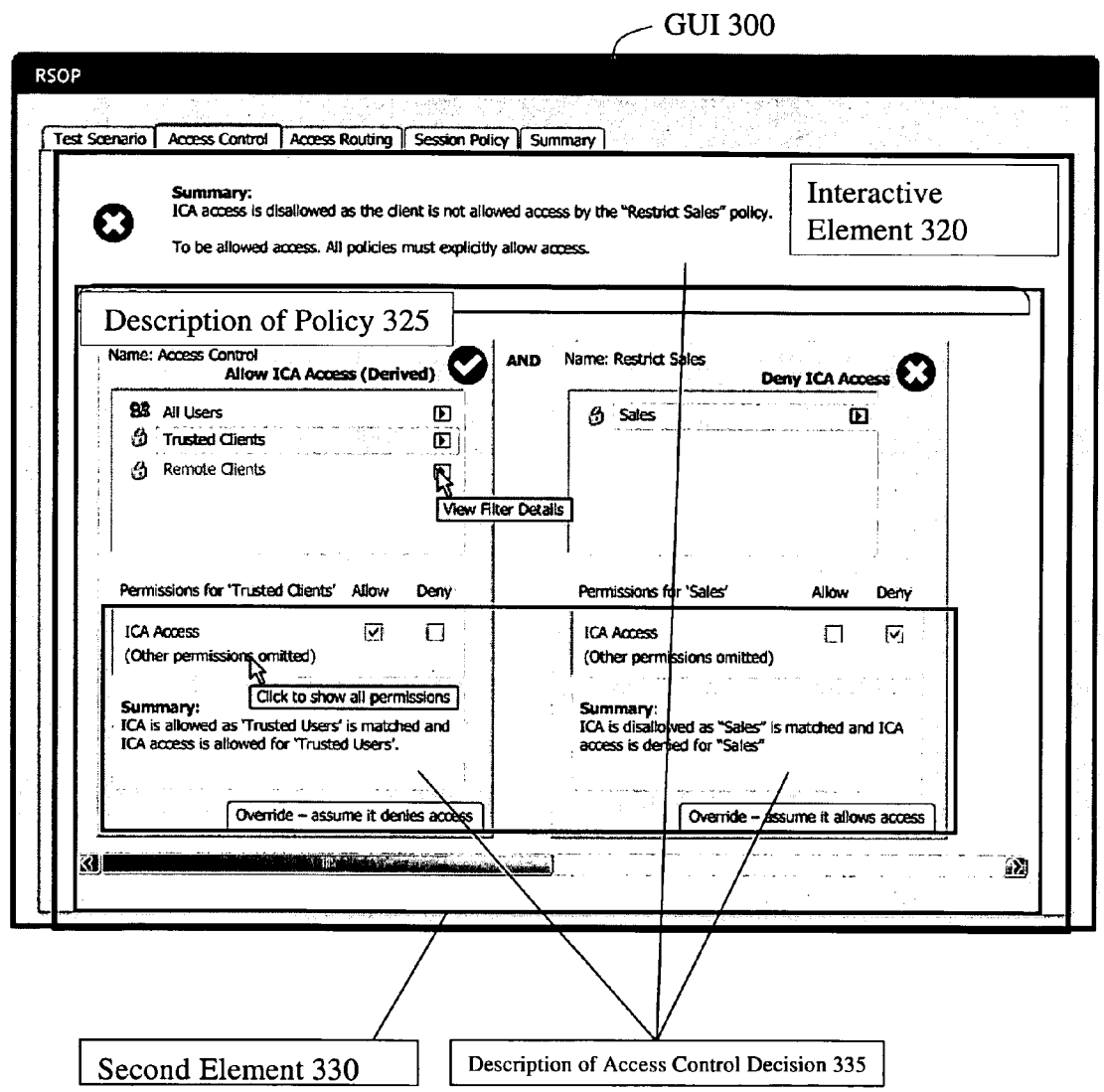
FIG. 3E is a screen shot depicting one embodiment of a user interface element displaying a decision.

Referring now to FIG. 3E, a screen shot depicts one embodiment of a user interface element displaying a decision. FIG. 3E includes the graphical user interface 300, an interactive element 320 including a description of at least one policy 325, and a second element 330 including a description of a decision 335. In some embodiments, and as depicted in FIG. 3E, the graphical user interface 300 displays the interactive element 320 and the second element 330 in a first interface element and displays the description 315 in a second interface element. In other embodiments, the graphical user interface 300 displays the interactive element 320, the second element 330, and the description 315 in a single interface element. In still other embodiments, and as shown in FIG. 3E, the graphical user interface 300 displays the interactive element 320 and the second element 330 in a single interface element. Alternatively, as shown in FIG. 3A, the graphical user interface 300 may display the interactive element 320 and the second element 330 as separate interface element.

In some embodiments, the description of the policy 325 includes an access control list. In one of these embodiments, for each entry in the access control list, the description of the policy 325 indicates whether the client satisfies the requirement in the access control list. In other embodiments, the description of the policy 325 includes a description of a level of auditing that would be applied if the policy 325 were applied to a request. In still other embodiments, the description of the policy 325 includes a description of a method of caching that would be applied if the policy 325 were applied to a request. In yet other embodiments, the description of the policy 325 includes a description of a method of load balancing that would be applied if the policy 325 were applied to a request.

In one embodiment, the description of the policy 325 lists all policies that have an effect on whether access is allowed or denied for the specified client, resource, or access method. In another embodiment, in which no access method is specified, the description of the policy 325 lists all policies that have an affect on any access method. In still another embodiment, for each policy, the applicability to the client or resource is highlighted together with any intermediate results. Intermediate results display a summary of how the results from different applicable policies affect the final decision—for example, and as shown in FIG. 3E, a policy for trusted clients might allow a method of access but a policy for clients who are members of a particular group ("Sales" in FIG. 3E) might deny the same method and (in the example shown in FIG. 3E) this results in a summary indicating that combining those two policies would result in a denial of access for the specified client.

In some embodiments, the graphical user interface displays an interface element allowing a user to select some or all of the data used in the tool to be presented in report form. In one of these embodiments, the user can highlight data for inclusion in a standard multi-part report. In another of these embodiments, the user can install custom report templates for use in report generation. In still another of these embodiments, the user can request the output of all data into the report, including client and resource details, overrides, policies applied and resultant access, auditing, session and other settings.

Figure 4A:
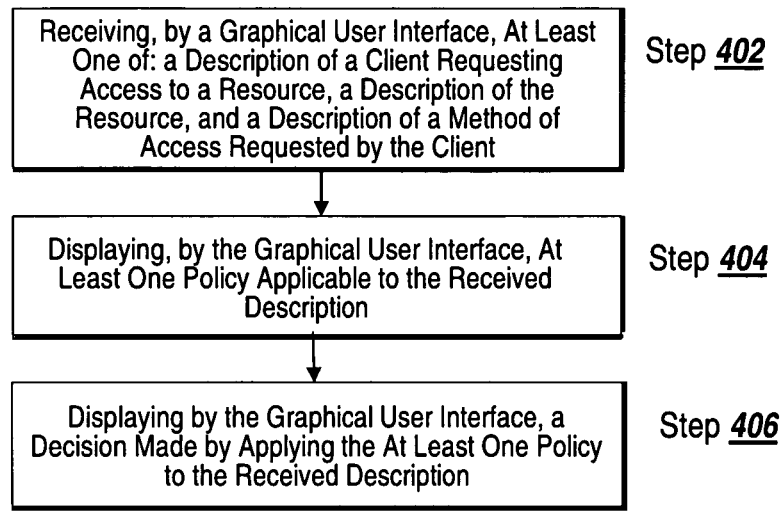
FIG. 4A is a flow diagram depicting one embodiment of the steps taken in a method for interactive policy evaluation using resultant sets of policies.

Referring now to FIG. 4A, a flow diagram depicts one embodiment of the steps taken in a method for interactive policy evaluation using resultant sets of policies. In brief overview, a graphical user interface receives at least one: a description of a client requesting access to a resource, a description of the resource, and a description of a method of access requested by the client (step 402). The graphical user interface displays at least one policy applicable to the received description (step 404). The graphical user interface displays a decision made by applying the at least one policy to the received description (step 406).

Referring still to FIG. 4A, and in greater detail, a graphical user interface receives at least one: a description of a client requesting access to a resource, a description of the resource, and a description of a method of access requested by the client (step 402). In one embodiment, the graphical user interface displays a plurality of interactive elements, which form an interactive tool allowing an administrator to specify a circumstance (such as a scenario in which a user requests access to a resource) and to view which policies would be applied in the circumstance and the permissions that result from applying the policies to the circumstance. In another embodiment, the administrator may also use the interactive tool to view the policies that would be applied under theoretical circumstances. For example, an administrator may specify a type of client request for a type of access to determine whether a client or user will be impacted by a policy change, or to determine what access rights a user needs in order to access a particular resource. In still another embodiment, the user of the graphical user interface 300 enters data associated with either a client requesting access to a resource or associated with the requested resource or associated with a policy applicable to the client requesting access. In some embodiments, the user provides data directly to the graphical user interface 300. In other embodiments, the user provides data to the policy simulation engine 302.

In one embodiment, the graphical user interface 300 receives, in the description of the client, a user identifier. In another embodiment, the graphical user interface 300 receives, in the description of the client, a client internet protocol (IP) address. In still another embodiment, the graphical user interface 300 receives an identification of a virus-checking program on the client. In yet another embodiment, the graphical user interface 300 receives, in the description of the client, a time of day.

In one embodiment, the graphical user interface 300 receives, in the description of the resource, an identifier of the resource. In another embodiment, the graphical user interface 300 receives, in the description of the resource, an identification of a property of the resource. In still another embodiment, the graphical user interface 300 receives, in the description of the resource, a file type of the resource. In still even another embodiment, the graphical user interface 300 receives, in the description of the resource, an identification of a server on which the resource resides. In yet another embodiment, the graphical user interface 300 receives, in the description of the resource, an identification of an operating system executed by a server on which the resource resides.

In one embodiment, the graphical user interface 300 retrieves, from a database, a configuration file identifying a file type of the resource. In another embodiment, the graphical user interface 300 retrieves, from a database, a configuration file identifying a server on which the resource resides. In still another embodiment, the graphical user interface 300 retrieves, from a database, a configuration file identifying an operating system executed by a server on which the resource resides. In yet another embodiment, the graphical user interface 300 retrieves, from a database, a configuration file storing a description of the client. In some embodiments, the graphical user interface 300 retrieves, from a database, a state file saved by an administrator. In other embodiments, the graphical user interface 300 retrieves, from a database, a state file generated responsive to a user error.

In one embodiment, the graphical user interface 300 receives, in the description of the requested method of access, a description of a request to retrieve the resource. In another embodiment, the graphical user interface 300 receives, in the description of the requested method of access, a description of a request to remotely access the resource. In still another embodiment, the graphical user interface 300 receives, in the description of the requested method of access, a description of a request, a description of a presentation layer protocol. In still even another embodiment, the graphical user interface 300 receives, in the description of the requested method of access, a description of a request, a description of a type of client agent. In yet another embodiment, the graphical user interface 300 displays a graphical user interface element displaying the at least one policy applicable to the client request for access to the resource.

The graphical user interface displays at least one policy applicable to the client request for access to the resource (step 404). In one embodiment, the graphical user interface displays a user interface element displaying the at least one policy. In some embodiments, the at least one policy is applicable to the received description of the client or the resource or the access method. In one of these embodiments, the description of the client includes information identifying a group of users to which a user of the client belongs and to which the at least one policy applies. In another of these embodiments, the description of the access method identifies a requested method to which the at least one policy applies. In still another of these embodiments, the description of the resource identifies a type of resource to which the at least one policy applies.

In one embodiment, the graphical user interface 300 displays the at least one policy responsive to receiving a request for information associated with the at least one policy. For example, the user may request additional information associated with a decision and receive a display of the at least one policy that affected the outcome of the decision. In another embodiment, the graphical user interface 300 displays at least one filter associated with the policy. For example, the user may request additional information associated with the at least one policy and receive the display of at least one filter which is a requirement for satisfaction of the policy. In some embodiments, the graphical user interface 300 displays a user interface element allowing a user to modify at least one filter associated with the policy. In other embodiments, the graphical user interface 300 displays a user interface element allowing a user to modify the policy.

The graphical user interface displays a decision made by applying the at least one policy to the received description (step 406). In some embodiments, the graphical user interface 300 displays a resultant set associated with the application of the at least one policy to the client request for access to the resource. In one embodiment, the graphical user interface 300 displays a result of simulating the application of a policy to a request, responsive to the received details in description 310. In some embodiments, the graphical user interface 300 displays a decision generated by a simulation component, such as a policy simulation engine 302. In other embodiments, the graphical user interface 300 displays a first decision inferred from a second decision. In one of these embodiments, a user provides a description of a client, a resource, or a method of access and a simulation tool—such as a policy simulation engine 302—identifies a first decision from which the simulation tool infers a second decision and transmits the information to the graphical user interface 300 for display. For example, and in another of these embodiments, the first decision indicates that a client, a resource, or a method of access fails to satisfy a first filter. In this embodiment, if a second filter or a policy requires the satisfaction of the first filter, the simulation tool may infer that the second filter or policy will not be satisfied either. In another embodiment, the resulting second decision will indicate that the user of the client is not authorized to access the resource according to the method of access. In still another of these embodiments, a user of the graphical user interface 300 may indicate that a first filter is met or unmet and the simulation tool will determined that a second filter is defined in such a way that it is possible to infer the value of the second filter given the known value of the first filter. In still even another of these embodiments, the tool can signal that such a value is derived from other input values, rather than from that input explicitly.

In some embodiments, the graphical user interface 300 receives, from a simulation component, a decision made by applying the at least one policy to the received description. In one of these embodiments, for example, the simulation component receives the description from the graphical user interface 300, simulates the application of the at least one policy to the received description and transmits, to the graphical user interface 300, the decision. In another of these embodiments, the decision is transmitted to other tools, in addition to the graphical user interface. In still another of these embodiments, the simulation component is a policy simulation engine 302.

In some embodiments, a policy may be an expression, which may be evaluated in a context to determine the result. In one of these embodiments, the context describes some or all of the characteristics of a scenario in which the policy is applied. For example, the context may include the client name, the client's IP address, or the resource's name; however, the context need not specify all of the details of the scenario. In another of these embodiments, where the policy is an access control policy, this determined result may be a decision to allow or deny a request. In still another of these embodiments, where the policy is an access routing policy, the determined result may specify a particular method of access—for example, specifying that the client may download, access remotely, or transform a requested resource from one format to another.

In some embodiments, a policy simulation engine 302 simulates an application of a policy to generate a result displayed by the graphical user interface 300. In one of these embodiments, the policy simulation engine 302 is an actively used policy engine that makes decisions for active sessions. In other embodiments, a simulation policy engine, which is not an active policy engine making decisions for active sessions, simulates an application of a policy to generate a result displayed by the graphical user interface 300.

In some embodiments, the simulation takes place as it would in an active "run-time" environment. In one of these embodiments, if information is needed that is unknown then the same determination is made that would be taken if the information is unknown at run-time—typically this might be to assume the 'default' or to raise an error. In other embodiments, the simulation propagates any uncertainties and operations in the policy expression are explicitly extended to describe how uncertainty should be propagated. In one of these embodiments, for example, the expression (User=Fred) will return either 'true' or 'false' during runtime, but, during tristate simulation, the simulation may also return 'unknown' if the user name is not known. Similarly, a combinatory operator such as 'and' may be used in parts of the policy expression. For 'normal' operation, this has the following transition table:

| Inputs | Output |
| --- | --- |
| All inputs are 'true' | True |
| Any input is 'false' | False |

During 'tristate' evaluation the transition table is extended:

| Inputs | Output |
| --- | --- |
| All inputs are 'true' | True |
| Any input is 'false' | False |
| At least one input is 'unknown' and all other inputs are 'true' | Unknown |

Similarly the 'not' and 'or' operators are extended as follows:

"Or" Operator

| Inputs | Output |
|---|---|
| Any input is 'true' | True |
| All inputs are 'false' | False |
| At least one input is 'unknown' and all other inputs are 'false' | Unknown |

"Not" Operator

| Inputs | Output |
|---|---|
| Input is 'True' | False |
| Input is 'False' | True |
| Input is 'Unknown' | Unknown |

Any policy may be described using such an expression.

Figure 4B:
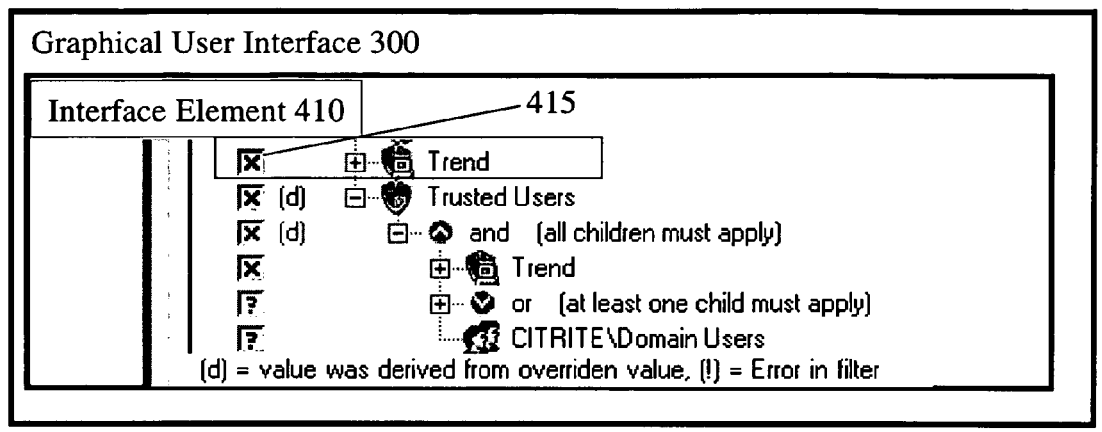
FIG. 4B is a screen shot depicting one embodiment of a graphical user interface displaying a decision generated responsive to an automatic inference.

Referring now to FIG. 4B, a screen shot depicts one embodiment of a graphical user interface displaying a decision generated responsive to an automatic inference. As shown in FIG. 4B, an administrator has indicated, in a first interface element 410, that a first filter ("Trend") is not satisfied (by interacting with a second interface element 415). The simulation tool identifies a second filter ("Trusted Users") as a compound filter, relying on the satisfaction of all of its sub-filters to reach a determination that a client request is authorized (identified in FIG. 4B by the "and" clause, which indicates that, in this embodiment, the second filter requires satisfaction of all the conjunctive sub-filters), and determines that the first filter is one of the sub-filters of the second filter; therefore, the simulation tool can infer that if the first filter is not met, the second filter will not be met, regardless of whether other sub-filters on which the satisfaction compound second filter relies are themselves satisfied. In some embodiments, a user of the graphical user interface 300 may interact with an interface element to request an override of an inference. In one of these embodiments, requesting an override results in the simulation tool generating a decision indicating that the overridden filter was met even if an analysis of related filters would have otherwise resulted in generation of a decision indicating that the overridden filter was not met (or vice versa, as appropriate). In other embodiments, the graphical user interface 300 displays an identification of an overridden filter, the filter override resulting from an evaluation of other data or filters. In still other embodiments, the graphical user interface 300 displays an identification of an overridden policy.

In some embodiments, the graphical user interface 300 displays an interface element displaying a summary of a decision. In one of these embodiments, the summary includes a description of how the interactive tool determined the decision. In another of these embodiments, the summary includes a description of at least one policy that affected the decision. In still another of these embodiments, the summary includes a description of a deficiency in the client, the request or the resource that resulted in a particular decision. In yet another of these embodiments, the summary includes a description of a characteristic of the client, the request, or the resource that satisfied a requirement of a policy, resulting in a particular decision. In yet another of these embodiments, the summary includes a description of an effect one policy had on a second policy that resulted in a particular decision. For example, the summary may include a description of a first policy that requires a client, a resource, or a request to satisfy a second policy where failure to meet the requirements of the second policy results in failure to satisfy the first policy.

In some embodiments, the graphical user interface 300 displays summaries for a plurality of decisions. In one of these embodiments, the graphical user interface 300 displays a given scenario (details regarding at least one of a client, a resource, and a request for access to the resource by the client) against multiple stored sets of policies. In another of these embodiments, the graphical user interface 300 displays a decision resulting from an application of a first, existing policy to the scenario and also displays a decision resulting from an application of a second existing policy, which is a modified version of the first policy. In another of these embodiments, the graphical user interface 300 displays a decision resulting from an application of a first, existing policy to the scenario and also displays a decision resulting from an application of a second theoretical policy, which is a modified version of the first policy. In another of these embodiments, the graphical user interface 300 displays a decision resulting from an application of a first theoretical policy to the scenario and also displays a decision resulting from an application of a second theoretical policy, which is a modified version of the first policy. In still another of these embodiments, the graphical user interface 300 displays the differences between the decisions resulting from an application of each of the policies to the scenario. In yet another of these embodiments, viewing multiple decisions together allows an administrator to view the effect of different policies on a number of scenarios before the administrator begins enforcing any of the policies.

Figure 4C:
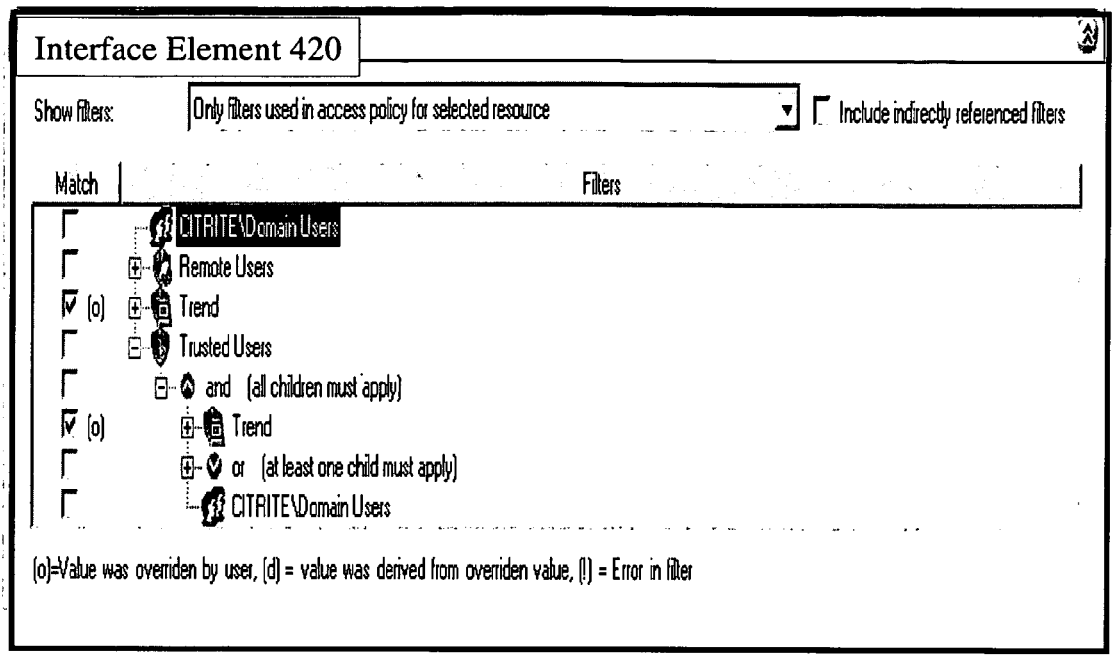
FIG. 4C is a screen shot depicting one embodiment of a graphical user interface displaying a condition that is used in a policy.

Referring now to FIG. 4C, and in some embodiments, the graphical user interface 300 includes an interface element 420 that displays a filter, or condition, that is used in a policy. In one embodiment, the interactive tool provided by the graphical user interface 300 generates a decision by determining whether a client, a resource or an access request satisfies a policy defined by a filter. In another embodiment, the applicability of policies generally depends on whether the client and/or resource meet a number of conditions. In another of these embodiments, these conditions are separately named and classified—for example "Trusted Client", "Access from Partner Site" or "Has Trend Installed". Such classifications may be referred to as 'Named Filters'. The filters may also be referred to as 'Dynamic Groups', as they act as a dynamic classification of clients into those clients who do or do not meet a certain set of criteria.

In one embodiment, the interface element 420 allows an administrator to view all or some of the defined named filters, and to view which filters the client or resource matches or does not match. In another embodiment, the interface element 420 allows a user to request the display of any sub-filters and conditions that make up a filter. In some embodiments, these sub-filters and conditions are defined as Boolean expressions—such as "Operating System is Windows AND Trend Version is greater than 5". In other embodiments, the tool also allows the administrator to override the definition of a filter and assume that the client does or does not match it (regardless of its original definition). In one of these embodiments, the ability to override the definition of a filter allows a user to debug proposed changes to the filter, or to determine what access would be permitted if the system changes slightly (for example, if the client upgraded a virus checker). In another of these embodiments, the interface element 420 displays an indication for each filter of whether a described client currently satisfies a requirement of the displayed filter, and whether the user requested an override of this value. In still another of these embodiments, a user interface element in the graphical user interface 300 provides a link allowing a user to view a particular test or filter where overrides were requested. In still other embodiments, the interface element 420 may display all defined named filters, or only a selection—for example, only those used in a policy or only those requested by the user.

In some embodiments, the graphical user interface 300 receives a modification to at least one filter. In one of these embodiments, the graphical user interface 300 displays a decision identified by the modified filter. In another of these embodiments, a determination is made, responsive to the modification, not to apply the applicable at least one policy to the received description. In still another of these embodiments, a determination is made, responsive to the modification, to apply at least one inapplicable policy to the received description. In yet another of these embodiments, the determination is displayed in the graphical user interface 300.

In some embodiments, the graphical user interface 300 receives a modification to at least one policy. In one of these embodiments, the graphical user interface 300 displays a decision identified by the modified policy. In another of these embodiments, a determination is made, responsive to the modification, not to apply the applicable policy to the received description. In still another of these embodiments, a determination is made, responsive to the modification, to apply at least one inapplicable policy to the received description. In yet another of these embodiments, the determination is displayed in the graphical user interface 300.

In one embodiment, the graphical user interface 300 receives a modification of the description of the user. In another embodiment, the graphical user interface 300 displays a decision identified by an application of the at least one policy to the modified user. In still another embodiment, the graphical user interface 300 receives a modification of the description of the requested resource. In yet another embodiment, the graphical user interface 300 displays a decision identified by an application of the at least one policy to the modified resource request.

In some embodiments, in addition to displaying the policies and settings that would be used for the given circumstance, allowing a user to enter a modification to a description or a policy allows many aspects of policy configuration to be overridden. For example, if a description of a decision specified that a client did not pass a 'Has Virus Checker Installed' test—then the administrator could override this setting, and determine whether, if the client did pass this test, the decision would change. Similarly, the administrator may indicate that a particular policy should be ignored, or that a particular server/services should be considered as out of service. In one of these embodiments, these facilities (which may collectively be referred to as "overrides") allow the tool to be used by the administrator to perform this type of 'what if' analysis.

In one embodiment, allowing the value of an entire expression or any sub-expression to be overridden allows a policy simulation engine 302 to make an assumption. For example, a user might specify that, for the purposes of investigation, evaluation of an expression "User is member of group 'sales'" should be treated as evaluating to 'true'—or equally should be treated as evaluating to 'false', regardless of whether this is actually the case. In another embodiment, an override may be used as a short hand or for 'what if' analyses. For example, a user may want to answer the question "if I modified policy 1 to disallow access for this group, what would the overall effect be". An example of a use of overrides as a short hand might be "I know this is a trusted user—so mark the 'trusted users' filter as true"; this may be quicker and simpler than entering all the user's details to cause the evaluation to take place.

In some embodiments, rather than providing buttons or other user interface to allow the administrator to change between "no override", "override as true" and "override as false", the graphical user interface 300 provides a toggle control to toggle between "evaluates to true" and "override as false"—for expressions that naturally evaluate to true, and a toggle between "evaluates to false" and "override to true" for expressions that naturally evaluated to false. In one of these embodiments, during tristate evaluation, a toggle can be used to cycle between three cases—true, false and unknown (one of which will be the natural evaluated value, the other two of which will be overrides). In another of these embodiments, where one policy references a second policy, or other reusable parts of a policy (such as named filters), then an override to a reusable part will apply to equally to all uses of that reusable part. For example, if Policy 1 is defined as "if(Filter1), return 'red' else 'blue'", and if Policy 2 is defined as "if(Filter1) return 'orange' else 'green'", then overriding Filter1 will affect both policies—leading to either (Policy1=red, Policy2=orange) or (Policy1=blue, Policy2=green). In still another of these embodiments, it is also possible to override only one of these by overriding the reference to the shared element.

In one embodiment, the graphical user interface 300 provides an interface element for generating a display of these analyses indicating that the analyses are provided as a result of an override request and identifying the overridden filter, condition or policy. In other embodiments, the administrator may configure the tool to allow the tool to identify by inference a condition that the administrator could satisfy in order to satisfy an overridden or unsatisfied policy. In one of these embodiments, the tool may identify a valid set of values that would satisfy any of the terms in a compound condition.

The graphical user interface and the policy simulation engine provide functionality allowing users, such as administrators, to interactively evaluate a wide variety of policies using dynamically generated, interactive resultant sets of policies. In some embodiments, the graphical user interface displays a decision made by applying the at least one access control policy to the at least one received description; in some of these embodiments, the graphical user interface receives the decision for display from the policy simulation engine that simulates the application of the at least one access control policy. For example, FIGS. 3B-3E and 4B-4C depict some embodiments of scenarios involving the use of access control policies. In other embodiments, however, the graphical user interface displays a decision made by applying other policies to the at least one received description. In one of these embodiments, the graphical user interface displays a decision made by applying the at least one auditing policy to the at least one received description; the graphical user interface receives the decision for display from the policy simulation engine that simulates the application of the at least one auditing policy. In another of these embodiments, the graphical user interface displays a decision made by applying the at least one alarm-triggering policy to the at least one received description; the graphical user interface receives the decision for display from the policy simulation engine that simulates the application of the at least one alarm-triggering policy. In still another of these embodiments, the graphical user interface displays a decision made by applying the at least one load-balancing policy to the at least one received description; the graphical user interface receives the decision for display from the policy simulation engine that simulates the application of the at least one load-balancing policy. In still even another of these embodiments, the graphical user interface displays a decision made by applying the at least one resource-provisioning policy to the at least one received description; the graphical user interface receives the decision for display from the policy simulation engine that simulates the application of the at least one resource-provisioning policy. In yet another of these embodiments, the graphical user interface displays a decision made by applying the at least one caching policy to the at least one received description; the graphical user interface receives the decision for display from the policy simulation engine that simulates the application of the at least one caching policy.

In one embodiment, the method for interactive policy evaluation using dynamically generated interactive resultant sets of auditing policies includes the step of receiving, by a graphical user interface, at least one of: a description of a client requesting access to a resource, a description of the resource, and a description of a method of access requested by the client. In another embodiment, the method includes the step of displaying, by the graphical user interface, at least one auditing policy applicable to the at least one received description. In still another embodiment, the method includes the step of displaying, by the graphical user interface, a decision made by applying the at least one auditing policy to the at least one received description. In some embodiments, a system for interactive policy evaluation using dynamically generated interactive resultant sets of auditing policies includes a graphical user interface displaying the decision of the application of the at least one auditing policy to the at least one received resource and a policy simulation engine simulating the application of the at least one auditing policy. In one of these embodiments, the graphical user interface is a graphical user interface 300 as described above. In other embodiments, the policy simulation engine is a policy simulation engine 302 as described above.

In one embodiment, the method for interactive policy evaluation using dynamically generated interactive resultant sets of caching policies includes the step of receiving, by a graphical user interface, at least one of: a description of a client requesting access to a resource, a description of the resource, and a description of a method of access requested by the client. In another embodiment, the method includes the step of displaying, by the graphical user interface, at least one caching policy applicable to the at least one received description. In still another embodiment, the method includes the step of displaying, by the graphical user interface, a decision made by applying the at least one caching policy to the at least one received description. In some embodiments, a system for interactive policy evaluation using dynamically generated interactive resultant sets of caching policies includes a graphical user interface displaying the decision of the application of the at least one caching policy to the at least one received resource and a policy simulation engine simulating the application of the at least one caching policy. In one of these embodiments, the graphical user interface is a graphical user interface 300 as described above. In other embodiments, the policy simulation engine is a policy simulation engine 302 as described above.

In one embodiment, the method for interactive policy evaluation using dynamically generated interactive resultant sets of access control policies includes the step of receiving, by a graphical user interface, at least one of: a description of a client requesting access to a resource, a description of the resource, and a description of a method of access requested by the client. In another embodiment, the method includes the step of displaying, by the graphical user interface, at least one access control policy applicable to the at least one received description. In still another embodiment, the method includes the step of displaying, by the graphical user interface, a decision made by applying the at least one access control policy to the at least one received description. In some embodiments, a system for interactive policy evaluation using dynamically generated interactive resultant sets of access control policies includes a graphical user interface displaying the decision of the application of the at least one access control policy to the at least one received resource and a policy simulation engine simulating the application of the at least one access control policy. In one of these embodiments, the graphical user interface is a graphical user interface 300 as described above. In other embodiments, the policy simulation engine is a policy simulation engine 302 as described above.

Referring now to FIG. 4D, a screen shot depicts one embodiment of a graphical user interface including an interface element displaying an access routing decision. The graphical user interface receives at least one of a description of a client requesting access to a resource and a description of the resource, and the graphical user interface displays, in an interface element 430, at least one access routing policy applicable to the client request for access to the resource. In one embodiment, the graphical user interface 300 displays an access routing decision identified responsive to an application of an access routing policy to at least one of the description of the client requesting access to the resource and the description of the resource. In another embodiment, the graphical user interface 300 displays an identification of a service, or class of service, that will be authorized should the described client make the described request for access to the described resource.

In one embodiment, the graphical user interface 300 may receive a description of a type of client and display in the interface element 430 a description of an access routing decision indicating that the client is authorized to download the described resource. In another embodiment, the graphical user interface 300 may receive a description of a type of client and display in the interface element 430 a description of an access routing decision indicating that the client is authorized to receive application output data generated by an execution of the described resource on a remote machine 106 and transmitted to the client according to a presentation layer protocol. In still another embodiment, the graphical user interface 300 may receive a description of a type of client and display in the interface element 430 a description of an access routing decision indicating that the client is authorized to receive the described resource via a method for application streaming. In yet another embodiment, an access routing policy may determine both the type of access to be attempted (e.g., an applicable protocol) and the class or instance of service/server (a WINDOWS server or a server 106 providing access to a resource via a particular method or a server 106 belonging to a particular server farm 38). In some embodiments, a determination by an access routing policy can have a significant impact on other forms of policy, as it is in effect selecting a 'concrete' access request (e.g. to use ICA to access server 53) rather than an abstract access request (e.g. Run Word). In other embodiments, a simulation component with which the graphical user interface 300 interacts applies information relating to service load or server availability to the simulation of an application of an access routing policy to a described client or resource. In one of these embodiments, overrides are supported to allow an administrator to modify the information on which the simulation component relies. In another of these embodiments, the simulation component uses a session identifier to retrieve information relating to server load and availability for use in simulating application of a policy to an actual request. For example, an administrator may provide a description of a previously-made access request and request the display of what access routing determination would have been reached had a modified access routing policy been in effect at the time of the previous access request.

In some embodiments, the graphical user interface 300 displays additional information associated with the described resource responsive to an access routing decision. In one of these embodiments, the graphical user interface 300 displays an identification of a server farm 38 in which a server 106 resides, the server 106 providing access to the described resource. In another of these embodiments, the graphical user interface 300 displays an identification of a protocol for use in communicating with a server 106 providing access to the described resource. In still another of these embodiments, the graphical user interface 300 displays information associated with server load and availability of a server 106 providing access to the described resource. In still even another of these embodiments, the graphical user interface 300 displays information identifying a version of an application (such as an operating system) executed by a server 106 providing access to the described resource. In yet another of these embodiments, the graphical user interface 300 cannot display an identification of a server 106 providing access to the described resource until the access routing decision has been specified. For example, if the graphical user interface 300 receives a description of a resource that identifies a word processing application that is subject to an access routing policy, the graphical user interface 300 may delay the display of information associated with a server 106 providing access to the word processing application because the graphical user interface 300 may not have access to the information until the simulation of the application of the access routing policy identifies a type of access method and a level of service protocol and service.

In some embodiments, once the graphical user interface 300 displays information associated with the described resource and with an access routing policy decision, the graphical user interface 300 may display additional information associated with a session between a client 102 and a server 106. In one of these embodiments, there are a plurality of settings associated with a session between a client 102 and a server 106; for example, client settings, network settings and server settings may be displayed. In another of these embodiments, these settings may be determined by a policy commonly referred to as a 'session policy'. In still another of these embodiments, the session policy differs from an access policy in that it results in a number of settings—for example bandwidth limits, color depth, screen resolution, available optimization techniques, etc.—that are focused on the connection between the client and the server instead of on whether the client or a user of the client is authorized to access a resource provided by a server. In still even another of these embodiments, different session policies may apply to a given circumstance depending on client and/or resource properties. In yet another of these embodiments, a view of the information associated with the described resource displays the set of policies that may apply to a request for the resource, indicates which do apply in the given scenario, and may allow a user of the graphical user interface 300 to request and view additional information associated with the session policy.

In one embodiment, a method for interactive policy evaluation using dynamically generated interactive resultant sets of load-balancing policies includes the step of receiving, by a graphical user interface, a description of at least one resource. In another embodiment, the method includes the step of displaying, by the graphical user interface, at least one load-balancing policy applicable to the at least one resource. In still another embodiment, the method includes the step of displaying, by the graphical user interface, a decision made by applying the at least one load-balancing policy to the at least one resource. In yet another embodiment, the method includes the step of simulating, by a policy simulation engine, the application of the at least one load-balancing policy to the at least one resource. In some embodiments, the graphical user interface displaying the decision of the application of the at least one load-balancing policy to the at least one received resource is a graphical user interface 300 as described above. In other embodiments, the policy simulation engine simulating the application of the at least one load-balancing policy is a policy simulation engine 302. In some embodiments, the load-balancing policy determines whether the at least one resource will provide a user with access to a requested resource. In other embodiments, the load-balancing policy is applied independent of a user request for access.

In some embodiments, a policy need not solely govern a user's access control. For example, in one of these embodiments, a policy controls a scheduling decision, such as determination regarding whether to perform a data back-up operation. In other embodiments, the methods and systems described herein may be used in a scenario in which a policy decision is made dependant on a set of circumstances, which may or may not include a client or a resource; for example, a policy might be applied whenever a fault is diagnosed in a network, in order to determine the severity of the fault and determine how to handle the fault.

In one embodiment, a method for interactive policy evaluation using dynamically generated interactive resultant sets of fault-detection policies includes the step of receiving, by a graphical user interface, a description of at least one resource. In another embodiment, the method includes the step of displaying, by the graphical user interface, at least one fault-detection policy applicable to the at least one resource. In still another embodiment, the method includes the step of displaying, by the graphical user interface, a decision made by applying the at least one fault-detection policy to the at least one resource. In yet another embodiment, the method includes the step of simulating, by a policy simulation engine, the application of the at least one fault-detection policy to the at least one resource. In some embodiments, the graphical user interface displaying the decision of the application of the at least one fault-detection policy to the at least one resource is a graphical user interface 300 as described above. In other embodiments, the policy simulation engine simulating the application of the at least one fault-detection policy is a policy simulation engine 302.

An example of a fault-detection policy might be:

```
if(faulty.source = 'component A')
    severity=100
    action = shut down system
```

In one of these embodiments, the methods and systems described herein may be used to analyze such policies. In another of these embodiments, rather than details being supplied about the client, resource and access methods, details are provided about the circumstance in which the policy is applied. For example, and in still another of these embodiments, if a policy can make decisions based on an attribute, then the attribute would be an input to the tool. In yet another of these embodiments, attributes may include, without limitation, a source of the fault raised, time of day of the fault, an identification of a number of similar faults raised within a time period, or an operating mode of the system on which the fault occurred.

In some embodiments, the methods and systems described herein provide a user with functionality for viewing a resultant set of policies given a particular scenario—a particular user or type of user requesting access to a particular resource via a particular access method. In one of these embodiments, the interactive tool and the graphical user interface with which the user interacts allows a user such as an administrator to view a specific circumstance and determine which policies would be applied and to view a resulting set of permissions. In another of these embodiments, the interactive tool allows the user to understand what effect a particular policy or policy change has on a particular user.

In other embodiments, methods and systems provide a user with the ability to view all resources under the control of the user and to view what classes of access are available to different classes of user for each resource or class of resource. In one of these embodiments, therefore, rather than view a specific scenario, the user receives a higher level view focused instead on the classes of users and how the different classes may access each of a plurality of resources.

Figure 5A:
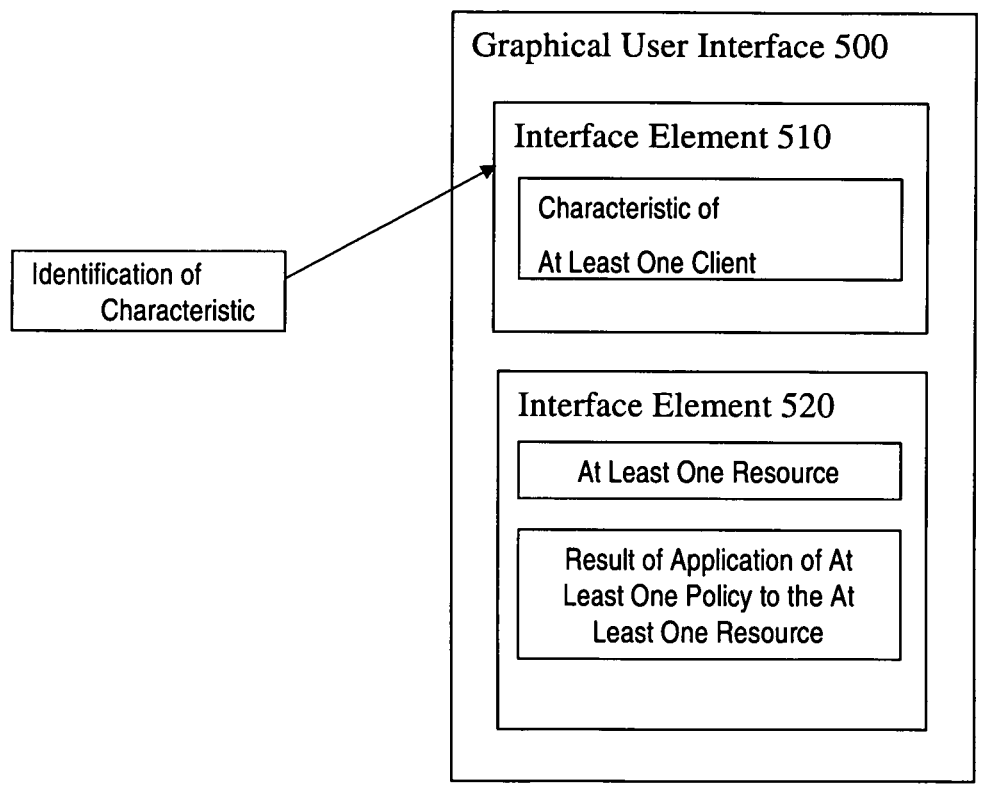
FIG. 5A is a block diagram depicting one embodiment of a system for interactive evaluation of policies using a graphical user interface.

Referring now to FIG. 5A, a block diagram depicts one embodiment of a system for interactive evaluation of policies using a graphical user interface including a first graphical user interface element 510 and a second graphical user interface element 520. The first graphical user interface element 510 enumerates at least one resource. The second graphical user interface element 520 receives an identification of a characteristic of at least one client and displays a result of an application of at least one policy associated with the at least one resource to the at least one client, the at least one policy applied responsive to the received identification of the characteristic. In one embodiment, a graphical user interface 500 displays the first graphical user interface element 510 and the second graphical user interface element 520 to a user. In another embodiment, the graphical user interface 500 is a web-based interface and displays information generated remotely. In still another embodiment, the graphical user interface 500 displays information generated locally.

Referring now to FIG. 5A, and in greater detail, the first graphical user interface element 510 displays at least one characteristic associated with at least one client. In one embodiment, the first graphical user interface element 510 includes an interface element displaying an identification of a type of anti-virus program executed by the at least one client. In another embodiment, the first graphical user interface element 510 includes an interface element displaying an identification of a type of operating system executed by the at least one client. In still another embodiment, the first graphical user interface element 510 includes an interface element displaying an identification of a type of application executed by the at least one client. In still even another embodiment, the first graphical user interface element 510 includes an interface element displaying an internet protocol (IP) address range, the at least one client assigned IP addresses in the IP address range. In yet another embodiment, the first graphical user interface element 510 includes an interface element receiving the at least one characteristic associated with the at least one client. For example, and in one embodiment, the first graphical user interface element 510 includes a text box, drop-down menu, radio button or checkmark box with which a user interacts to identify the at least one characteristic. In some embodiments, the first graphical user interface element 510 displays an identification of a filter matched by at least one client. In other embodiments, the first graphical user interface element 510 displays an identification of a filter unmatched by at least one client.

The second graphical user interface element 520 enumerates at least one resource and displays a result of an application of at least one policy associated with the at least one resource to the at least one client. In one embodiment, the second graphical user interface element 520 includes an interface element displaying an enumeration of a plurality of resources under the control of a user. In another embodiment, the second graphical user interface element 520 includes an interface element displaying at least one policy. In still another embodiment, the second graphical user interface element 520 includes an interface element displaying a requirement of the at least one policy.

In one another embodiment, the second graphical user interface element 520 includes an interface element indicating that an application of the at least one policy to the at least one client results in a denial of access to the at least one resource by the at least one client. In another embodiment, the second graphical user interface element 520 includes an interface element indicating that an application of the at least one policy to the at least one client results in a denial of access to the at least one resource by the at least one client. In still another embodiment, the second graphical user interface element 520 includes an interface element indicating that an application of the at least one policy to the at least one client results in an allowance of access to the at least one resource by the client. In yet another embodiment, the second graphical user interface element 520 includes an interface element indicating that additional information associated with the at least one client is needed to identify a result of an application of the at least one policy to the at least one client.

In some embodiments, the first graphical user interface 510 and the second graphical user interface 520 display the results generated by a tool used in interactive evaluation of policies. In one embodiment, the display of the at least one characteristic associated with at least one client is a display of a list of criteria affecting the classification of users. In another embodiment, the display is a display of a list of group memberships or other information used by policies for one or more of the resources being examined by the tool. In still another embodiment, the list of criteria is an atomic list. In still even another embodiment, if the information in the list is not atomic (i.e., it is possible to break down the information in to smaller pieces), then the tool provides a user with the ability to expand the list to include a display of the atomic information. An example might be an item "Trusted Users" where "Trusted Users" is a classification used in policies, and that is itself defined as AND(Domain User, Virus OK). "Domain User" and "Virus OK" may themselves be atomic conditions, or may be broken down in a similar way. In yet another embodiment, this part of the tool is used to identify the classes of user for which data is to be displayed in the second part of the tool.

In one embodiment, the second graphical user interface 520 displays a list of all resources evaluated by the interactive tool. In another embodiment, these resources are either automatically or manually classified according to the structure of the resource name (many resources have a hierarchical name such as A/B/C) and/or the access that is permitted for the identified class of user. For example, and in still another embodiment, the tool may use a single entry A/ . . . to represent the resources A/B A/B/C and A/D. In still even another embodiment, a user may interact with the second graphical user interface 520 to expand this summary entry. In yet another embodiment, the interactive tool automatically expands the summary entry if the access permitted to the individual resources it represents is different from the access permitted for other resources in the class.

In one embodiment, the second graphical user interface 520 displays at least one policy that affects a particular resource or set of resources. In another embodiment, the user may select a resource or summary line in the second graphical user interface 520 and the policies that apply to this resource or resources will be displayed. In still another embodiment, for each policy that affects the class of client identified in the first graphical user interface 510 will be displayed to allow the user to view the effect of policy evaluation.

Figure 5B:
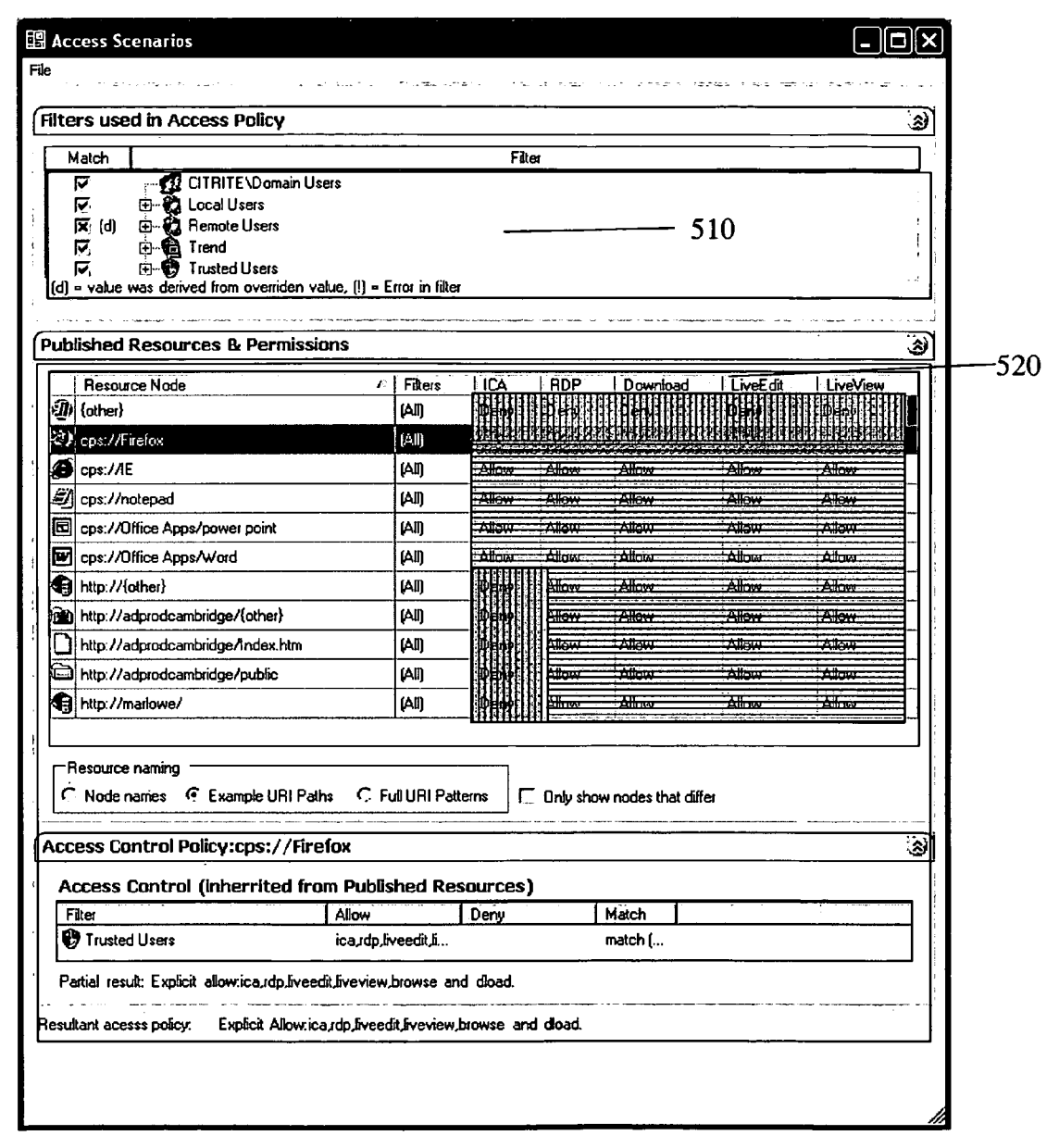

Referring now to FIG. 5B, a screen shot depicts one embodiment of a user interface for interactive evaluation of policies. The first graphical user interface element 510 displays an identification of a client. As depicted in FIG. 5B, the first graphical user interface element 510 displays a client that includes users in a domain, remote users, local users and a sub-category of users referred to as trusted users. In some embodiments, the first graphical user interface element 510 includes an interface element with which a user may identify a characteristic of the at least one client. As depicted in FIG. 5B, the user has indicated that the user wishes to view decisions for the at least one client satisfies the requirements of the filters "Local Users," "Trend," and "Trusted Users," and the group "Citrite\Domain Users."

The second graphical user interface 520 enumerates at least one resource and displays a result of an application of at least one policy associated with the at least one resource to the at least one client. As shown in FIG. 5B (under the heading "Resource Node"), the displayed enumeration of resources may include, without limitation, local applications, remotely-executing applications, internet or intranet sites, and file shares. In one embodiment, the display of the result of the application of the at least one policy may include a color-coded display. For example, and as shown in FIG. 5B, the second graphical user interface 520 may visually code, using a first color or pattern (horizontal lines in FIG. 5B), a displayed identification that the application of the policy will result in an allowance of a request for access to a particular resource and the second graphical user interface 520 may color code using a second color (vertical lines in FIG. 5B), a displayed identification that the application of the policy will result in a denial of a request for access to a particular resource.

Figure 5C:
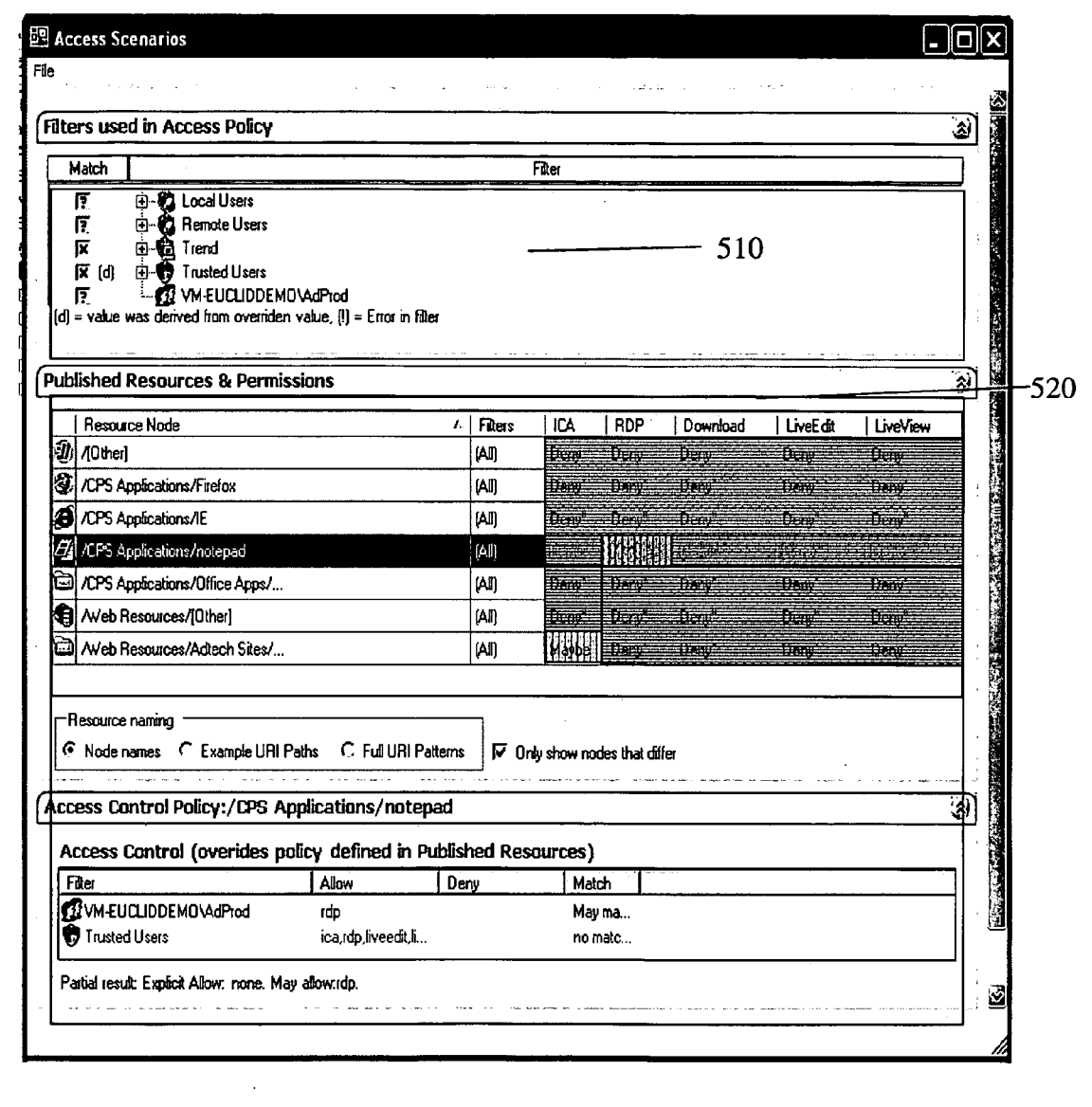

Referring now to FIG. 5C, a screen shot depicts an embodiment of a user interface for interactive evaluation of policies. As shown in FIG. 5C (under the heading "Resource Node"), the displayed enumeration of resources may include, without limitation, local applications, remotely-executing applications, internet or intranet sites, and file shares. In one embodiment, and as described in connection with FIG. 5B, the display of the result of the application of the at least one policy may include a color-coded display. For example, and as shown in FIG. 5C, the second graphical user interface 520 may visually code, using a first color or pattern (horizontal lines in FIG. 5C), a displayed identification that the application of the policy will result in a denial of a request for access to a particular resource and the second graphical user interface 520 may visually code using, a second color or pattern, (vertical lines in FIG. 5C), a displayed identification that the application of the policy will result in an indication that insufficient data exists to reach a determination.

In some embodiments an administrator wants to see the effect of a policy on a large number of classes of users. For example, and in one of these embodiments, if users are classified by group, IP address and virus check, then there may be a very large number of potential combinations of classification which might have to be manually checked in order to see the result of any policy change—even if the change affected only one aspect. In another embodiment, using tristate logic may reduce this burden for the administrator. In still another embodiment, using the methods and systems described herein allows an administrator to indicate that they wish to see the effect of policies for users meeting one classification, and to indicate that they wish to see this regardless as to whether the use also meets other classifications. This may also be achieved using TriState logic as described above.

For example, and as shown in FIG. 5C, an administrator may indicate that they wish to see: i) the resources available to users who do not meet the 'Trend' classification; and ii) the results if it is unknown whether the user meets the Local Users, Remote Users or AdProd classifications. In response, the tool has indicated that access to all the listed resources is denied, regardless of whether the user meets these other classifications; with the exception of RDP access to /CPS Applications/notepad and /Web Resources/Adtech Sites. For these resources, the user may be permitted access, depending on whether or not they meet one or more of the classifications marked as unknown. The administrator can therefore concentrate his attention on access to these resources, saving considerable time.

In one embodiment, a system for interactive evaluation of access control policies using a graphical user interface includes a first graphical user interface element, a second graphical user interface element, and a policy simulation engine. In another embodiment, the first graphical user interface element displays at least one characteristic associated with at least one client. In still another embodiment, the second graphical user interface element enumerates at least one resource and displays a result of an application of at least one access control policy associated with the at least one resource to the at least one client. In yet another embodiment, the policy simulation engine simulates the application of the at least one access control policy associated with the at least one resource to the at least one client. In some embodiments, a graphical user interface 500 includes the first and second graphical user interface elements. In other embodiments, the policy simulation engine is a policy simulation engine 302 as described above.

In one embodiment, a system for interactive evaluation of auditing policies using a graphical user interface includes a first graphical user interface element, a second graphical user interface element, and a policy simulation engine. In another embodiment, the first graphical user interface element displays at least one characteristic associated with at least one client. In still another embodiment, the second graphical user interface element enumerates at least one resource and displays a result of an application of at least one auditing policy associated with the at least one resource to the at least one client. In yet another embodiment, the policy simulation engine simulates the application of the at least one auditing policy associated with the at least one resource to the at least one client. In some embodiments, a graphical user interface 500 includes the first and second graphical user interface elements. In other embodiments, the policy simulation engine is a policy simulation engine 302 as described above.

In one embodiment, a system for interactive evaluation of caching policies using a graphical user interface includes a first graphical user interface element, a second graphical user interface element, and a policy simulation engine. In another embodiment, the first graphical user interface element displays at least one characteristic associated with at least one client. In still another embodiment, the second graphical user interface element enumerates at least one resource and displays a result of an application of at least one caching policy associated with the at least one resource to the at least one client. In yet another embodiment, the policy simulation engine simulates the application of the at least one caching policy associated with the at least one resource to the at least one client. In some embodiments, a graphical user interface 500 includes the first and second graphical user interface elements. In other embodiments, the policy simulation engine is a policy simulation engine 302 as described above.

In one embodiment, a system for interactive evaluation of load-balancing policies using a graphical user interface includes a first graphical user interface element, a second graphical user interface element, and a policy simulation engine. In another embodiment, the first graphical user interface element displays at least one characteristic associated with at least one client. In still another embodiment, the second graphical user interface element enumerates at least one resource and displays a result of an application of at least one load-balancing policy associated with the at least one resource to the at least one client. In yet another embodiment, the policy simulation engine simulates the application of the at least one load-balancing policy associated with the at least one resource to the at least one client. In some embodiments, a graphical user interface 500 includes the first and second graphical user interface elements. In other embodiments, the policy simulation engine is a policy simulation engine 302 as described above.

In one embodiment, a system for interactive evaluation of access-routing policies using a graphical user interface includes a first graphical user interface element, a second graphical user interface element, and a policy simulation engine. In another embodiment, the first graphical user interface element displays at least one characteristic associated with at least one client. In still another embodiment, the second graphical user interface element enumerates at least one resource and displays a result of an application of at least one access-routing policy associated with the at least one resource to the at least one client. In yet another embodiment, the policy simulation engine simulates the application of the at least one access-routing policy associated with the at least one resource to the at least one client. In some embodiments, a graphical user interface 500 includes the first and second graphical user interface elements. In other embodiments, the policy simulation engine is a policy simulation engine 302 as described above.

In one embodiment, a system for interactive evaluation of fault-detection policies using a graphical user interface includes a first graphical user interface element, a second graphical user interface element, and a policy simulation engine. In another embodiment, the first graphical user interface element displays at least one characteristic associated with at least one resource. In still another embodiment, the second graphical user interface element displays a result of an application of at least one fault-detection policy associated with the at least one resource to the at least one resource. In yet another embodiment, the policy simulation engine simulates the application of the at least one fault-detection policy associated with the at least one resource to the at least one client. In some embodiments, a graphical user interface 500 includes the first and second graphical user interface elements. In other embodiments, the policy simulation engine is a policy simulation engine 302 as described above.

Figure 6:
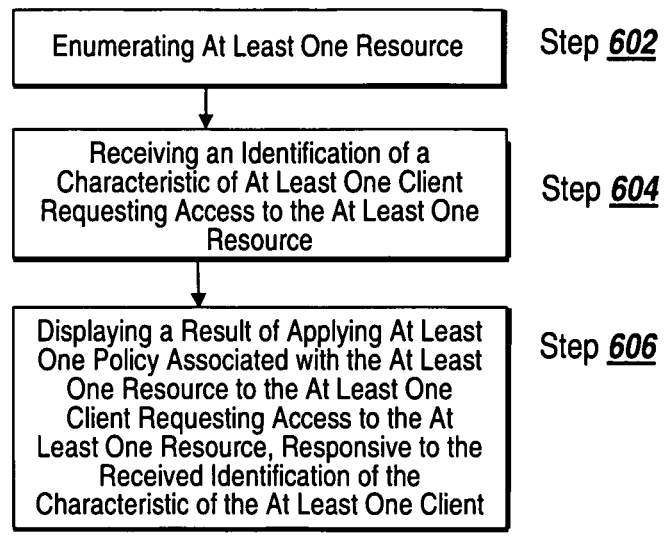
FIG. 6 is a flow diagram depicting one embodiment of the steps taken in a method for interactive evaluation of policies using a graphical user interface.

Referring now to FIG. 6, a flow diagram depicts one embodiment of the steps taken in a method for interactive evaluation of policies using a graphical user interface. The method includes the step of displaying an identification of at least one resource (step 602). The method includes the step of receiving an identification of a characteristic of at least one client requesting access to the at least one resource (step 604). The method includes the step of displaying a result of applying at least one policy associated with the at least one resource to the at least one client requesting access to the at least one resource, responsive to the received identification of the characteristic of the at least one client (step 606).

In some embodiments, an administrator maintains polices for a large number of classes of user. For example, and in one of these embodiments, if rules are specified depending on user groups, internet protocol (IP) address range and virus protection level, then the number of classes of user will be (no. of available user groups) times (no. of IP address ranges used in policies) times (no. of available virus protection levels). In another of these embodiments, an interactive tool makes use of tri-state logic in applying policies to classes of users, allowing administrators to manage the vast amount of information. In still another of these embodiments, the interactive tool reduces the number of different resource classes that must be considered—rather than using static classes of resources, the interactive tool dynamically classifies resources depending on the permitted access for a particular class of users to keep the amount of information to be displayed to a minimum.

Referring now to FIG. 6, and in greater detail, an identification of at least one resource is enumerated (step 602). In one embodiment, the graphical user interface element 500 displays the identification of the at least one resource. In another embodiment, the graphical user interface element 510 displays a plurality of resources over which a user has administrative control. In still another embodiment, the identification of the at least one resource is retrieved from a configuration file identifying available resources.

In some embodiments, at least one category of clients is displayed. In one embodiment, the graphical user interface 500 displays the at least one category of clients. In another embodiment, a user interacts with the graphical user interface 510 to add a category of clients to a display. In still another embodiment, the graphical user interface 510 displays a plurality of categories of clients. In yet another embodiment, clients are categorized according to characteristics including, but not limited to, internet protocol addresses, operating system types, applications executed on the client, types of internet access available to the clients, and authorization levels of the clients (trusted, untrusted, etc.).

An identification of a characteristic of at least one client requesting access to the at least one resource is received (step 606). In one embodiment, an identification of a type of operating system executed on the at least one client is received. In another embodiment, an identification of a type of application executed on the at least one client is received. In still another embodiment, an identification of a group in which the at least one client are members is received. In yet another embodiment, an identification of a range of internet protocol addresses associated with the at least one client is received.

In some embodiments, a characteristic of a client includes an indication as to whether or not to consider that characteristic of the client in evaluating policies. In one of these embodiments, for example, as opposed to identifying a characteristic such as a range of IP addresses or a kind of operating system executed by a client, a user may indicate that the policy simulation engine should take the characteristic into consideration in simulating an application of a policy to the client. In another of these embodiments, the user may indicate that the policy simulation engine should not take the characteristic into consideration in simulating an application of a policy to the client—for example, if a policy includes a filter requiring that the client have a particular characteristic, the user may indicate that the policy simulation engine should attempt to simulate an application of a policy without determining whether the filter is satisfied.

In some embodiments, a characteristic of at least one client considered in evaluating policies is the negation of another characteristic—for example, a characteristic may indicate that the at least one client is not a member of a group (e.g., "a User not in Sales"). In other embodiments, a user of the system may chose not to specify certain characteristics even if those characteristics were identified by the tool or are used in one or more policies.

In one embodiment, the characteristic of the client is an indication that the client, or a characteristic of the client, satisfies a requirement of a filter. In another embodiment, the characteristic of the client is an indication that the client, or a characteristic of the client, does not satisfy a requirement of a filter.

In some embodiments, the policy simulation engine identifies a characteristic that may be associated with the at least one client. In one of these embodiments, the graphical user interface displays the characteristic identified by the policy simulation engine. In another of these embodiments, the graphical user interface receives, from a user, confirmation that the characteristic identified by the policy simulation engine is associated with the at least one client. In still another of these embodiments, the graphical user interface receives, from a user, an indication that the characteristic identified by the policy simulation engine is not associated with the at least one client.

In one embodiment, a determination is made as to whether at least one policy applies to the at least one client, responsive to the received identification of the characteristic. In another embodiment, an indication that a second identification of a second characteristic is required to determine whether the at least one policy applies to the at least one client is displayed. In still another embodiment, a determination is made that at least one policy applies to the at least one client, responsive to the received identification of the characteristic. In some embodiments, at least one policy associated with the at least one resource is displayed.

A result of applying at least one policy associated with the at least one resource to the at least one client requesting access to the at least one resource is displayed, responsive to the received identification of the characteristic of the at least one client (step 608). In one embodiment, the graphical user interface 500 displays an indication that the application of the at least one policy results in a denial of access to the at least one resource by the at least one client. In another embodiment, the graphical user interface 500 displays an identification of a requirement not satisfied by the at least one client. In still another embodiment, the graphical user interface 500 displays an indication that the application of the at least one policy results in an authorization of access to the at least one resource by the at least one client. In still even another embodiment, the graphical user interface 500 displays an identification of a requirement satisfied by the at least one client. In yet another embodiment, the graphical user interface 500 displays an indication that the application of the at least one policy results in a request for additional information associated with the at least one client.

Figure 7:
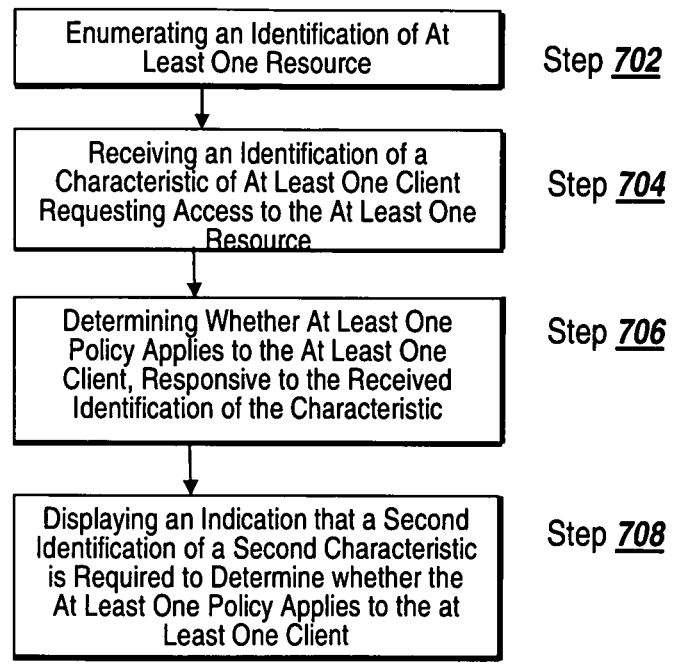
FIG. 7 is a flow diagram depicting an embodiment of the steps taken in a method for interactive evaluation of policies using a graphical user interface.

Referring now to FIG. 7, a flow diagram depicts one embodiment of the steps taken in a method for interactive evaluation of policies using a graphical user interface. The method includes the step of displaying an identification of at least one resource (step 702). The method includes the step of receiving an identification of a characteristic of the at least one client requesting access to the at least one resource (step 704). The method includes the step of determining whether at least one policy applies to the at least one client, responsive to the received identification of the characteristic (step 706). The method includes the step of displaying an indication that a second identification of a second characteristic is required to determine whether the at least one access applies to the at least one client (step 708).

Referring now to FIG. 7, and in greater detail, an identification of at least one resource is displayed (step 702). In one embodiment, the graphical user interface element 500 displays the at least one resource. In another embodiment, the graphical user interface element 510 displays a plurality of resources over which a user has administrative control. In still another embodiment, the identification of the at least one resource is retrieved from a configuration file identifying available resources.

In some embodiments, an identification of at least one client is displayed. In one embodiment, the graphical user interface 500 displays the at least one client. In another embodiment, a user interacts with the graphical user interface 510 to add a client to a display. In still another embodiment, the graphical user interface 510 displays a plurality of categories of clients. In yet another embodiment, clients are categorized according to characteristics including, but not limited to, internet protocol addresses, operating system types, applications executed on the client, types of internet access available to the clients, and authorization levels of the clients (trusted, untrusted, etc.).

An identification of a characteristic of the at least one client requesting access to the at least one resource is received (step 704). In one embodiment, an identification of a type of operating system executed on the at least one client is received. In another embodiment, an identification of a type of application executed on the at least one client is received. In still another embodiment, an identification of a group in which the at least one client are members is received. In yet another embodiment, an identification of a range of internet protocol addresses associated with the at least one client is received.

In some embodiments, the policy simulation engine identifies a characteristic that may be associated with the at least one client. In one of these embodiments, the graphical user interface displays the characteristic identified by the policy simulation engine. In another of these embodiments, the graphical user interface receives, from a user, confirmation that the characteristic identified by the policy simulation engine is associated with the at least one client. In still another of these embodiments, the graphical user interface receives, from a user, an indication that the characteristic identified by the policy simulation engine is not associated with the at least one client. In yet another of these embodiments, the graphical user interface receives, from a user, an indication that a negation of the characteristic identified by the policy simulation engine is associated with the at least one client.

A determination is made as to whether at least one policy applies to the at least one client, responsive to the received identification of the characteristic (step 706). In one embodiment, a determination is made that at least one policy applies to the at least one client, responsive to the received identification of the characteristic. In another embodiment, a determination is made that at least one policy does not apply to the at least one client, responsive to the received identification of the characteristic. In still another embodiment, a determination is made that a second identification of a second characteristic is required to determine whether the at least one policy applies to the at least one client.

In one embodiment, there is a plurality of conditions associated with a plurality of classifications of users. For example, in a scenario where there are three conditions (A, B, and C) used to classify users, there are eight sets of user classifications possible (None, A only, B only, C only, A and B, B and C, A and C, and all three). In some embodiments, and in many administrative scenarios, there are dozens of conditions evaluated to generate many more classifications of users. In one of these embodiments, the interactive tool uses tristate logic (as described above in connection with FIG. 5C) to limit the number of classifications that an administrator must consider in evaluating policies. In another of these embodiments, the tool allows an administrator to indicate that they do not know whether a user satisfies one of a plurality of characteristics; for example, the tool would allow an administrator to view, in a single classification, the access permitted to a user who meets filter A regardless of whether they meet filter B and/or C rather than having to look separately at "A only", "A and B", "A and C" and "A, B and C".

In some embodiments, when tristate logic is used, it is not possible to always give a yes/no answer as to whether access to a resource will be permitted. For example, in one of these embodiments, if a resource has a single policy indicating access is allowed provided that conditions A and B are both met, then for the classification "A is true, B and C unknown", it is not possible to indicate if access will or will not be permitted. In another of these embodiments, to handle this situation, the graphical user interface may display a response including a 'Maybe' answer. In still another of these embodiments, this is sufficient to indicate to an administrator that they have the option of more carefully examining a particular scenario if they require additional detail.

An indication is displayed that a second identification of a second characteristic is required to determine whether the at least one policy applies to the at least one client (step 708). In one embodiment, the graphical user interface 500 displays an indication that the application of the at least one policy results in a request for additional information associated with the at least one client. In another embodiment, the graphical user interface 500 displays an identification of a requirement satisfied by the at least one client. In still another embodiment, the graphical user interface 500 displays an identification of a requirement not satisfied by the at least one client.

As described above, the methods and systems described herein provide functionality allowing users, such as administrators, to interactively evaluate a wide variety of policies using a graphical user interface. In some embodiments, the policy is an access control policy; for example, FIGS. 5B-5C depict some embodiments of scenarios involving the use of access control policies. In other embodiments, however, the graphical user interface displays a result of applying other policies.

In one embodiment, a method for interactive evaluation of auditing policies using a graphical user interface includes the step of displaying at least one client. In another embodiment, the method includes the step of displaying an identification of at least one resource. In still another embodiment, the method includes the step of receiving an identification of a characteristic of the at least one client requesting access to the at least one resource. In still even another embodiment, the method includes the step of displaying a result of applying at least one auditing policy associated with the at least one resource to the at least one client requesting access to the at least one resource, responsive to the received identification of the characteristic of the at least one client. In some embodiments, the method includes the step of displaying an indication that a second identification of a second characteristic is required to determine whether the at least one auditing policy applies to the at least one client.

In one embodiment, a method for interactive evaluation of caching policies using a graphical user interface includes the step of displaying at least one client. In another embodiment, the method includes the step of displaying an identification of at least one resource. In still another embodiment, the method includes the step of receiving an identification of a characteristic of the at least one client requesting access to the at least one resource. In still even another embodiment, the method includes the step of displaying a result of applying at least one caching policy associated with the at least one resource to the at least one client requesting access to the at least one resource, responsive to the received identification of the characteristic of the at least one client. In some embodiments, the method includes the step of displaying an indication that a second identification of a second characteristic is required to determine whether the at least one caching policy applies to the at least one client.

In one embodiment, a method for interactive evaluation of access control policies using a graphical user interface includes the step of displaying at least one client. In another embodiment, the method includes the step of displaying an identification of at least one resource. In still another embodiment, the method includes the step of receiving an identification of a characteristic of the at least one client requesting access to the at least one resource. In still even another embodiment, the method includes the step of displaying a result of applying at least one access control policy associated with the at least one resource to the at least one client requesting access to the at least one resource, responsive to the received identification of the characteristic of the at least one client. In some embodiments, the method includes the step of displaying an indication that a second identification of a second characteristic is required to determine whether the at least one access control policy applies to the at least one client.

In one embodiment, a method for interactive evaluation of load-balancing policies using a graphical user interface includes the step of displaying at least one client. In another embodiment, the method includes the step of displaying an identification of at least one resource. In still another embodiment, the method includes the step of receiving an identification of a characteristic of the at least one client requesting access to the at least one resource. In still even another embodiment, the method includes the step of displaying a result of applying at least one load-balancing policy associated with the at least one resource to the at least one client requesting access to the at least one resource, responsive to the received identification of the characteristic of the at least one client. In some embodiments, the method includes the step of displaying an indication that a second identification of a second characteristic is required to determine whether the at least one load-balancing policy applies to the at least one client.

In one embodiment, a method for interactive evaluation of access-routing policies using a graphical user interface includes the step of displaying at least one client. In another embodiment, the method includes the step of displaying an identification of at least one resource. In still another embodiment, the method includes the step of receiving an identification of a characteristic of the at least one client requesting access to the at least one resource. In still even another embodiment, the method includes the step of displaying a result of applying at least one access-routing policy associated with the at least one resource to the at least one client requesting access to the at least one resource, responsive to the received identification of the characteristic of the at least one client. In some embodiments, the method includes the step of displaying an indication that a second identification of a second characteristic is required to determine whether the at least one access-routing policy applies to the at least one client.

In one embodiment, a method for interactive evaluation of fault-detection policies using a graphical user interface includes the step of displaying at least one category of resources. In another embodiment, the method includes the step of receiving an identification of a characteristic of the at least one resource. In still another embodiment, the method includes the step of displaying a result of applying at least one fault-detection policy associated with the at least one resource to the at least one resource, responsive to the received identification of the characteristic of the at least one resource. In some embodiments, the method includes the step of displaying an indication that a second identification of a second characteristic is required to determine whether the at least one fault-detection policy applies to the at least one resource.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for interactive evaluation of policies using a graphical user interface, it will now become apparent to one of skill in the art that the other embodiments incorporating the concepts of the disclosure may be used. Therefore, the disclosure should not be limited to certain embodiments, but rather should be limited only by the spirit and scope of the following claims.

What is claimed is:

1. A method for interactive evaluation of policies using a graphical user interface to display the effect of alterable access policies on clients and resources, the method comprising the steps of:
   (a) receiving, by a policy engine, a request to access at least one resource stored on a server from a client;
   (b) transmitting, by the policy engine, a collection agent to the client in response to receiving the request;
   (c) receiving, by the policy engine from the collection agent executing on the client, an identification of a characteristic of at least one client requesting access to the at least one resource;
   (d) enumerating an identification of at least one resource;
   (e) applying at least one policy including a first policy associated with the at least one resource to the at least one client requesting access to the at least one resource, responsive to the received identification of the characteristic of the at least one client;
   (f) displaying data on the graphical user interface wherein the graphical user interface includes:
      an interactive element that receives input from a user that alters settings in the first policy;
      a description of the identified characteristic of at least one client received from the collection agent executing on the client; and
      a description of the results of applying the first policy including whether the client may access the requested resource;
   (g) receiving the input altering the settings of the first policy using the interactive element;
   (h) simulating an application of the altered first policy producing an output comprising at least one description of a setting that resulted in denial of access to the requested resource in the case that the requested resource is denied, the description of the setting comprising a summary indicating how the altered first policy produced the result; and
   (i) displaying the output of the simulation including the description of the summary indicating how the altered first policy produced the result in the graphical user interface.

2. The method of claim 1 further comprising the step of receiving an identification of a filter in the first policy, the filter satisfied by the at least one client.

3. The method of claim 1 further comprising the step of receiving an identification of a filter in the first policy, the filter not satisfied by the at least one client.

4. The method of claim 1 further comprising the step of identifying, by a policy simulation engine, a characteristic of the at least one client responsive to an evaluation of at least one filter in the first policy.

5. The method of claim 1, wherein step (c) further comprises receiving an identification of a type of operating system executed on the at least one client.

6. The method of claim 1, wherein step (c) further comprises receiving an identification of a type of application executed on the at least one client.

7. The method of claim 1, wherein step (c) further comprises receiving an identification of a group in which the at least one client is a member.

8. The method of claim 1, wherein step (c) further comprises receiving an identification of a range of internet protocol addresses associated with the at least client.

9. The method of claim 1 further comprising the step of determining whether first policy applies to the at least one client, responsive to the received identification of the characteristic.

10. The method of claim 9, wherein step (e) further comprises displaying an indication that a second identification of a second characteristic is required to determine whether the first policy applies to the at least one client.

11. The method of claim 9, further comprising the step of determining that at least one policy applies to the at least one client, responsive to the received identification of the characteristic.

12. The method of claim 1, wherein step (e) further comprises displaying an identification of a requirement not satisfied by the at least one client.

13. The method of claim 1, wherein step (e) further comprises displaying an identification of a requirement satisfied by the at least one client.

14. The method of claim 1, wherein step (e) further comprises displaying, by the graphical user interface, an indication that the application of the first policy results in a request for additional information associated with the at least one client.

15. The method of claim 1, wherein step (e) further comprises displaying, by the graphical user interface, a result of applying an auditing policy to the at least one client.

16. The method of claim 1, wherein step (e) further comprises displaying, by the graphical user interface, a result of applying a caching policy to the at least one client.

17. The method of claim 1, wherein step (e) further comprises displaying, by the graphical user interface, a result of applying a load balancing policy to the at least one client.

18. The method of claim 1, wherein step (f) further comprises displaying one result of a type of access from a plurality of types of access to the resource.

19. The method of claim 18, wherein the plurality of types of access includes at least one of: downloading, view remotely, and application streaming.

20. The method of claim 1, wherein the request to access at least one resource stored on a server from a client is communicated using a remote display protocol.

21. A method for interactive evaluation of policies using a graphical user interface to display the effect of alterable access policies on clients and resources, the method comprising the steps of:
  (a) displaying an identification of at least one resource;
  (b) receiving an identification of a characteristic of at least one client requesting access to the at least one resource;
  (c) displaying an indication that a second identification of a second characteristic is required to determine whether at least one policy including a first policy applies to the at least one client;
  (d) displaying data on a graphical user interface wherein the graphical user interface includes:
    an interactive element that receives input from a user that alters settings in the first policy;
    a description of the identified characteristic of at least one client received from the collection agent executing on the client;
    a description of the results of applying the first policy including whether the client may access the requested resource; and
    a description of an access routing decision, identified responsive to an application of an access routing policy to a description of the client requesting access to the resource and a description of the resource, the description indicating at least one of a method of access and a type of access;
  (e) receiving the input that alters the settings in the first policy using the interactive element;
  (f) simulating an application of the altered first policy producing an output comprising at least one description of a setting that resulted in denial of access to the requested resource in the case that the requested resource is denied, the description of the setting comprising a summary indicating how the altered first policy produced the result; and
  (g) displaying the output of the simulation including the description of the summary indicating how the altered first policy produced the result in the graphical user interface.

22. The method of claim 21 further comprising the step of receiving an identification of a filter in the first policy, the filter satisfied by the at least one client.

23. The method of claim 21 further comprising the step of receiving an identification of a filter in the first policy, the filter not satisfied by the at least one client.

24. The method of claim 21 further comprising the step of identifying, by a policy simulation engine, a characteristic of the at least one client responsive to an evaluation of at least one filter in the first policy.

25. The method of claim 21, wherein step (b) further comprises receiving an identification of a type of operating system executed on the at least one client.

26. The method of claim 21, wherein step (b) further comprises receiving an identification of a type of application executed on the at least one client.

27. The method of claim 21, wherein step (b) further comprises receiving an identification of a group in which the at least one client are members.

28. The method of claim 21, wherein step (c) further comprises determining that first policy applies to the at least one client, responsive to the received identification of the characteristic.

29. The method of claim 21, wherein step (c) further comprises determining that a second identification of a second characteristic is required to determine whether the first policy applies to the at least one client.

30. The method of claim 21, wherein step (c) further comprises determining whether at least one auditing policy applies to the at least one client, responsive to the received identification of the characteristic.

31. The method of claim 21, wherein step (c) further comprises determining whether at least one caching policy applies to the at least one client, responsive to the received identification of the characteristic.

32. The method of claim 21, wherein step (c) further comprises determining whether at least one load-balancing policy applies to the at least one client, responsive to the received identification of the characteristic.

33. The method of claim 21, wherein step (d) further comprises displaying, by the graphical user interface, an indication that the application of the first policy results in a request for additional information associated with the at least one client.

34. The method of claim 21, wherein step (d) further comprises displaying an identification of a requirement satisfied by the at least one client.

35. The method of claim 21, wherein step (d) further comprises displaying an identification of a requirement not satisfied by the at least one client.

36. The method of claim 21, wherein step (d) further comprises displaying an indication that a second identification of a second characteristic is required to determine whether at least one auditing policy applies to the at least one client.

37. The method of claim 21, wherein step (d) further comprises displaying an indication that a second identification of a second characteristic is required to determine whether at least one caching policy applies to the at least one client.

38. The method of claim 21, wherein step (d) further comprises displaying an indication that a second identification of a second characteristic is required to determine whether at least one load-balancing policy applies to the at least one client.

39. The method of claim 21 further comprising the step of receiving, from a policy simulation engine, the indication that the second identification of the second characteristic is required to determine whether the first policy applies to the at least one client.

40. A system for interactive evaluation of policies using a graphical user interface to display the effect of alterable access policies on clients and resources, the system comprising:
  a memory;
  a processor configured to execute instructions stored in the memory to:
    apply at least one policy including a first policy associated with at least one resource to at least one client requesting access to the at least one resource, responsive to the received identification of the characteristic of the at least one client;
    displaying data on a graphical user interface wherein the graphical user interface includes:

a first graphical user interface element enumerating at least one resource; and a second graphical user interface element that receives input from a user that alters a characteristic of the at least one client; and receiving the input that alters the characteristic of the at least one client;

simulating an application of the altered characteristic to the at least one resource producing an output comprising at least one description of a setting that resulted in denial of access to the requested resource in the case that the requested resource is denied, the description of the setting comprising a summary indicating how the altered characteristic produced the result; and displaying the output, including the description of the summary indicating how the altered characteristic produced the result, in the graphical user interface.

41. The system of claim 40, wherein the first graphical user interface element further comprises a display of an identification of a type of anti-virus program executed by the at least one client.

42. The system of claim 40, wherein the first graphical user interface element further comprises a display of an identification of a type of operating system executed by the at least one client.

43. The system of claim 40, wherein the first graphical user interface element further comprises a display of an identification of a type of application executed by the at least one client.

44. The system of claim 40, wherein the first graphical user interface element further comprises a display of an internet protocol (IP) address range, the at least one client assigned an IP address in the IP address range.

45. The system of claim 40, wherein the first graphical user interface element further comprises an interface element for receiving an identification of at least one characteristic of the at least one client.

46. The system of claim 40, wherein the second graphical user interface element further comprises an interface element displaying the first policy.

47. The system of claim 40, wherein the second graphical user interface element further comprises an interface element displaying a requirement of the first policy.

48. The system of claim 40, wherein the second graphical user interface element further comprises an interface element displaying a filter of the first policy.

49. The system of claim 40, wherein the second graphical user interface element further comprises an interface element indicating that an application of the first policy to the at least one client results in a denial of access to the at least one resource by the at least one client.

50. The system of claim 40, wherein the second graphical user interface element further comprises an interface element indicating that an application of the first policy to the at least one client results in an allowance of access to the at least one resource by the at least one client.

51. The system of claim 40, wherein the second graphical user interface element further comprises an interface element indicating that additional information associated with the at least one client is needed to identify a result of an application of the first policy to the at least one client.

52. The system of claim 40, wherein the second graphical user interface element further comprises an interface element displaying a result of applying an access control policy to the at least one client.

53. The system of claim 40, wherein the second graphical user interface element further comprises an interface element displaying a result of applying an auditing policy to the at least one client.

54. The system of claim 40, wherein the second graphical user interface element further comprises an interface element displaying a result of applying a caching policy to the at least one client.

55. The system of claim 40, wherein the second graphical user interface element further comprises an interface element displaying a result of applying a load-balancing policy to the at least one client.

56. The system of claim 40 further comprising a policy simulation engine generating the result of the application of the first policy associated with the at least one resource to the at least one client.

57. The system of claim 40 further comprising a graphical user interface element receiving an identification of a filter in the first policy, the filter satisfied by the at least one client.

58. The system of claim 40 further comprising a graphical user interface element receiving an identification of a filter in the first policy, the filter not satisfied by the at least one client.

59. The system of claim 40 further comprising a graphical user interface element receiving, by a policy simulation engine, a characteristic of the at least one client responsive to an evaluation of at least one filter in the first policy.

\* \* \* \* \*